(12) United States Patent
Higgins

(10) Patent No.: US 8,417,392 B2
(45) Date of Patent: Apr. 9, 2013

(54) QUALIFICATION SYSTEM AND METHOD FOR CHILLED WATER PLANT OPERATIONS

(75) Inventor: Robert Higgins, Henderson, NV (US)

(73) Assignee: Siemens Industry, Inc., Alpharetta, GA (US)

( * ) Notice: Subject to any disclaimer, the term of this patent is extended or adjusted under 35 U.S.C. 154(b) by 568 days.

(21) Appl. No.: 12/758,780

(22) Filed: Apr. 12, 2010

(65) Prior Publication Data

US 2011/0022241 A1  Jan. 27, 2011

Related U.S. Application Data

(63) Continuation-in-part of application No. 12/507,806, filed on Jul. 23, 2009, now Pat. No. 8,275,483.

(51) Int. Cl.
  *G05D 3/12* (2006.01)
  *G05D 5/00* (2006.01)
  *G05D 9/00* (2006.01)
  *G05D 11/00* (2006.01)
  *G05D 17/00* (2006.01)

(52) U.S. Cl. .......................... 700/295; 700/286; 700/292

(58) Field of Classification Search .................. 700/286, 700/291–292, 295
  See application file for complete search history.

(56) References Cited

U.S. PATENT DOCUMENTS

| | | | |
|---|---|---|---|
| 4,139,284 A | 2/1979 | Stella et al. | |
| 4,423,765 A | 1/1984 | Hildebrad et al. | |
| 4,879,879 A | 11/1989 | Marsala et al. | |
| 5,083,438 A | 1/1992 | McMullin | |
| 5,144,811 A | 9/1992 | Brodie et al. | |
| 5,539,633 A | 7/1996 | Hildebrand et al. | |
| 5,600,960 A * | 2/1997 | Schwedler et al. | ................ 62/99 |
| 5,632,154 A | 5/1997 | Sibik et al. | |
| 5,640,153 A | 6/1997 | Hildebrand et al. | |
| 5,729,474 A | 3/1998 | Hildebrand et al. | |
| 5,809,794 A | 9/1998 | Sibik et al. | |
| 5,946,926 A | 9/1999 | Hartman | |

(Continued)

FOREIGN PATENT DOCUMENTS

| | | |
|---|---|---|
| CN | 2630717 | 8/2004 |
| EP | 0895038 A1 * | 7/1998 |

(Continued)

OTHER PUBLICATIONS

Commercial HVAC Chiller Equipment, "Water-Cooled Chillers" Technical Development Program, Cat. No. 796-055, 2005, Carrier Corporation.

(Continued)

*Primary Examiner* — Ronald Hartman, Jr.

(57) ABSTRACT

A qualification system for determining the effects of one or more upgrades or modifications to a chilled water plant is disclosed herein. The qualification system my collect various data from operating logs of a chilled water plant. The data may be collected in stages, where at least one first stage may be used to collect data used to identify representative log data. The representative log data may then be used to perform an accurate analysis to determine the effects of one or more upgrades or modifications. In this manner, the qualification system provides accurate analysis while reducing data entry. In addition, the qualification system may accept varying amounts of data such as to reduce percentage error or the like in its analysis.

20 Claims, 16 Drawing Sheets

U.S. PATENT DOCUMENTS

| | | | |
|---|---|---|---|
| 5,963,458 A | 10/1999 | Cascia | |
| 6,085,532 A | 7/2000 | Sibik | |
| 6,158,493 A | 12/2000 | Hildebrand et al. | |
| 6,185,946 B1 | 2/2001 | Hartman | |
| 6,216,097 B1 | 4/2001 | Choo et al. | |
| 6,276,152 B1 | 8/2001 | Sibik | |
| 6,438,981 B1 | 8/2002 | Whiteside | |
| 6,446,448 B1 | 9/2002 | Wang et al. | |
| 6,467,288 B2 | 10/2002 | Kuroki et al. | |
| 6,499,308 B2 | 12/2002 | Inoue et al. | |
| 6,662,584 B1 | 12/2003 | Whiteside | |
| 6,718,779 B1 | 4/2004 | Henry | |
| 6,874,691 B1 | 4/2005 | Hildebrand et al. | |
| 7,349,824 B2* | 3/2008 | Seigel | 702/182 |
| 7,567,888 B2* | 7/2009 | Chang et al. | 702/182 |
| 2004/0059691 A1* | 3/2004 | Higgins | 705/412 |
| 2005/0192680 A1* | 9/2005 | Cascia et al. | 700/29 |
| 2008/0006044 A1 | 1/2008 | Tan | |
| 2008/0162077 A1* | 7/2008 | Chang et al. | 702/182 |
| 2009/0001202 A1 | 1/2009 | Lesar et al. | |
| 2009/0090498 A1 | 4/2009 | Okada | |
| 2009/0171512 A1 | 7/2009 | Duncan | |
| 2009/0314484 A1 | 12/2009 | Barrett et al. | |
| 2009/0319087 A1 | 12/2009 | Hasegawa et al. | |
| 2010/0100246 A1 | 4/2010 | Josserand et al. | |
| 2010/0307731 A1* | 12/2010 | Yonezawa et al. | 165/223 |
| 2011/0066298 A1* | 3/2011 | Francino et al. | 700/290 |
| 2012/0010757 A1* | 1/2012 | Francino et al. | 700/291 |
| 2012/0010758 A1* | 1/2012 | Francino et al. | 700/291 |

FOREIGN PATENT DOCUMENTS

| | | |
|---|---|---|
| JP | 2006-052880 A | 2/2006 |
| JP | 2008-261536 A | 10/2008 |
| KR | 10-0497909 B1 | 6/2005 |

OTHER PUBLICATIONS

Commercial HVAC Equipment, "Condensers and Cooling Towers" Technical Development Program, Cat. No. 796-060, 2005, Carrier Corporation.

www.coolenergytech.com, "Chiller Plant Optimizer", Aug. 14, 2007.

www.intdatsys.com/EWChillerPlant.htm, "Chiller Plant Optimization", copyright 2004-2008.

www.trane.com/Commercial/uploads/pdf/1244/TRACE700chillerplantanalyzer.pdf, "TRACE 700 Chiller Plant Analyzer", Dec. 22, 2006.

\* cited by examiner

*Fig. 4A*

| CT | Title Page Data Sheet | | _ □ × |
|---|---|---|---|

| Date of "Chalk Talk" Site Survey | |
|---|---|
| Site Name | Kim's Hotel & Casino |
| Site Address | Las Vegas, Nevada |
| | |
| Principal Site Contact | Kim Smith |
| Position | Engineer |
| Site Number | 00001 |
| | |
| Notes & Assumptions | |
| Equipment / Manufacturer Information | Record all Equipment Manufacturer Model & Serial Numbers |
| | |
| | |
| | |
| | |
| | |

*Fig. 4B*

Design Data Sheet

| State | City | | e app | c app | | Date | 9/28/2009 |
|---|---|---|---|---|---|---|---|
| NV | Kim's Casino | | 2 | 2 | | | |

404
404

Chillers — Design Data

| Device | CH Tons | CH RLA | CH PF | CH KW | CH KW/TON | PP HP | PP GPM | PP LOAD FACTOR | Eff % | CWP HP | CWP GPM | CWP LOAD FACTOR | CHILLER VOLTAGE | EVAP SUPPLY | EVAP RETURN | COND SUPPLY | COND RETURN | REFRIGERANT | CALCULATION METHOD | Min CHW Flow | Min CW Flow |
|---|---|---|---|---|---|---|---|---|---|---|---|---|---|---|---|---|---|---|---|---|
| Chiller 1 | 2000 | 195 | 0.90 | 1263 | 0.632 | 500 | 5200 | 90% | 95% | 100 | 6000 | 90% | 4160 | 42 | 52 | 85 | 94 | R-134A | RLA | 4160 | 4800 |
| Chiller 2 | 2000 | 195 | 0.90 | 1263 | 0.632 | 500 | 5200 | 90% | 95% | 100 | 6000 | 90% | 4160 | 42 | 52 | 85 | 94 | R-134A | RLA | 4160 | 4800 |
| Chiller 3 | 2000 | 195 | 0.90 | 1263 | 0.632 | 500 | 5200 | 90% | 96% | 100 | 6000 | 90% | 4160 | 42 | 52 | 85 | 94 | R-134A | RLA | 4160 | 4800 |
| Chiller 4 | 2000 | 195 | 0.90 | 1263 | 0.632 | 500 | 5200 | 90% | 195% | 100 | 6000 | 90% | 4160 | 42 | 52 | 85 | 94 | R-134A | RLA | 4160 | 4800 |
| Chiller 5 | | | | 0 | | 0 | 0 | | | 0 | 0 | | | | | | | | | 0 | 0 |
| Chiller 6 | | | | 0 | | 0 | 0 | | | 0 | 0 | | | | | | | | | 0 | 0 |
| Chiller 7 | | | | 0 | | 0 | 0 | | | 0 | 0 | | | | | | | | | 0 | 0 |
| Chiller 8 | | | | 0 | | 0 | 0 | | | 0 | 0 | | | | | | | | | 0 | 0 |
| Chiller 9 | | | | 0 | | 0 | 0 | | | 0 | 0 | | | | | | | | | 0 | 0 |
| Chiller 10 | | | | 0 | | 0 | 0 | | | 0 | 0 | | | | | | | | | 0 | 0 |
| als / Avera | 8000 | 780 | | 5052 | 0.632 | 2000 | 20800 | | | 400 | 24000 | | | | | | | | | | |

Replacement Chiller

| New Chiller | 2000 | 195 | 1 | 1263 | 1 | 500 | 5200 | 1 | | 100 | 6000 | 1 | 4160 | 42 | 52 | 85 | 94 | R-134A | | 4160 | 4800 |

Secondary Pumps

| SP | HP | GPM | SP LOAD FACTOR |
|---|---|---|---|
| SP - 1 | | | |
| SP - 2 | | | |
| SP - 3 | | | |
| SP - 4 | | | |
| SP - 5 | | | |
| SP - 6 | | | |
| SP - 7 | | | |
| SP - 8 | | | |
| SP - 9 | | | |
| SP - 10 | | | |

Cooling Tower

| Cooling Towers | Tons | Fan HP |
|---|---|---|
| CT - 1 | 2500 | 100 |
| CT - 2 | 2500 | 100 |
| CT - 3 | 2500 | 100 |
| CT - 4 | 2500 | 101 |
| CT - 5 | 0 | |
| CT - 6 | 0 | |
| CT - 7 | 0 | |
| CT - 8 | 0 | |
| CT - 9 | 0 | |
| CT - 10 | 0 | |
| | 1000.00 | |

Chiller Efficiency

| Chiller | EVAP DELTA | EVAP GPM/TON | COND DELTA | COND GPM/TON |
|---|---|---|---|---|
| Chiller 1 | 11 | 2.6 | 9 | 3.0 |
| Chiller 2 | 10 | 2.6 | 9 | 3.0 |
| Chiller 3 | 10 | 2.6 | 9 | 3.0 |
| Chiller 4 | 10 | 2.6 | 9 | 3.0 |
| Chiller 5 | | | | |
| Chiller 6 | | | | |
| Chiller 7 | | | | |
| Chiller 8 | | | | |
| Chiller 9 | | | | |
| Chiller 10 | | | | |
| AVERAGE | 10 | 2.4 | 9 | 3.0 |

Wet Bulb Data

| MONTH | Average Wet Bulb | Cooling Tower Approach |
|---|---|---|
| January | 50 | 4 |
| February | 50 | 4 |
| March | 50 | 4 |
| April | 50 | 4 |
| May | 63 | 7 |
| June | 67 | 5 |
| July | 72 | 7 |
| August | 72 | 7 |
| September | 63 | 5 |
| October | 55 | 5 |
| November | 50 | 4 |
| December | 50 | 4 |

| | air side data | | |
|---|---|---|---|
| VAV HP | eff% | cfm | |
| 0 | 95% | 1040000 | |

| Compressor Energy margin of error | 10% |
|---|---|

Energy Costs

| | Annual Total KWH | Dollar Per KWH |
|---|---|---|
| gas costs / decather m | | |
| 7 | 0 | 0.130 |

TOTALS

Fig. 4C

Reclaim Calculation Data Sheet

% Reclaim   10% ← 404

| Base Plant Load (BTU) | hours | Deca-Therms per Month | natural gas offset $ |
|---|---|---|---|
| 1083 | 558 | 725 | $5,078 |
| 1300 | 336 | 524 | $3,669 |
| 1517 | 744 | 1354 | $9,479 |
| 1625 | 720 | 1404 | $9,828 |
| 1733 | 744 | 1548 | $10,833 |
| 1950 | 720 | 1685 | $11,794 |
| 2167 | 744 | 1934 | $13,541 |
| 2600 | 744 | 2321 | $16,249 |
| 2600 | 720 | 2246 | $15,725 |
| 2167 | 744 | 1934 | $13,541 |
| 1733 | 360 | 749 | $5,242 |
| 1517 | 558 | 1016 | $7,109 |
| | 7692 | 17,441 | $122,086 |

* 1 decatherm = 1 Million BTU

Fig. 4D

Empirical Data Sheet

| Date | C1 | C2 | C3 | C4 | C5 | C6 | C7 | C8 | C9 | C10 | total | month average |
|---|---|---|---|---|---|---|---|---|---|---|---|---|
| 01/01/10 | 200 | 100 | 150 | 300 | | | | | | | 750 | 692 |
| 01/02/10 | 150 | 150 | 175 | 200 | | | | | | | 675 | |
| 01/03/10 | 150 | 150 | 150 | 200 | | | | | | | 650 | |
| 01/04/10 | | | | | | | | | | | | |
| 01/05/10 | | | | | | | | | | | | |
| 01/06/10 | | | | | | | | | | | | |
| 01/07/10 | | | | | | | | | | | | |
| 01/08/10 | | | | | | | | | | | | |
| 01/09/10 | | | | | | | | | | | | |
| 01/10/10 | | | | | | | | | | | | |
| 01/11/10 | | | | | | | | | | | | |
| 01/12/10 | | | | | | | | | | | | |
| 01/13/10 | | | | | | | | | | | | |
| 01/14/10 | | | | | | | | | | | | |
| 01/15/10 | | | | | | | | | | | | |
| 01/16/10 | | | | | | | | | | | | |
| 01/17/10 | | | | | | | | | | | | |
| 01/18/10 | | | | | | | | | | | | |
| 01/19/10 | | | | | | | | | | | | |
| 01/20/10 | | | | | | | | | | | | |
| 01/21/10 | | | | | | | | | | | | |
| 01/22/10 | | | | | | | | | | | | |
| 01/23/10 | | | | | | | | | | | | |
| 01/24/10 | | | | | | | | | | | | |
| 01/25/10 | | | | | | | | | | | | |
| 01/26/10 | | | | | | | | | | | | |
| 01/27/10 | | | | | | | | | | | | |
| 01/28/10 | | | | | | | | | | | | |
| 01/29/10 | | | | | | | | | | | | |
| 01/30/10 | | | | | | | | | | | | |
| 01/31/10 | | | | | | | | | | | | |

Columns C1–C10 grouped under "Chiller Energy". Arrow labeled 408 points to the C1 column.

*Fig. 4E-1*

Monthly Log Data Sheet

[Add Log] 416　[Remove Log] 420　[Goto Log] 424　January　Logs: 1　[Previous] 428　[Next] 432

| Date | 01/24/09 | | | | | | | Log: 1 |
|---|---|---|---|---|---|---|---|---|
| Data Entry | | | | | | | | |
| | VALUE | P-CHWS | P-CHWR | CWS | CWR | PP HZ | CWP HZ | SP HZ | CTF HZ |
| Offline - Chiller 1 - RLA | | | | | | | | | 41 |
| Offline - Chiller 2 - RLA | | | | | | | | | 41 |
| Offline - Chiller 3 - RLA | | | | | | | | | 41 |
| Chiller 4 - RLA | 140 | 41.0 | 46.0 | 71.0 | 79.0 | 60 | 60 | | 41 |
| Offline - Chiller 5 - | | | | | | | | | 41 |
| Offline - Chiller 6 - | | | | | | | | | 41 |
| Offline - Chiller 7 - | | | | | | | | | 41 |
| Offline - Chiller 8 - | | | | | | | | | 41 |
| Offline - Chiller 9 - | | | | | | | | | 41 |
| Offline - Chiller 10 - | | | | | | | | | 41 |

Chillers

| DEVICE | NOMINAL TONS | PROD TONS | VALUE | DEVICE KW | KW / TON | DF KW/TON | DF KW |
|---|---|---|---|---|---|---|---|
| Offline - Chiller 1 | | | | | | | |
| Offline - Chiller 2 | | | | | | | |
| Offline - Chiller 3 | | | | | | | |
| Chiller 4 | 2000 | 1083 | 140 | 907 | 0.837 | 0.431 | 467 |
| Offline - Chiller 5 | | | | | | | |
| Offline - Chiller 6 | | | | | | | |
| Offline - Chiller 7 | | | | | | | |
| Offline - Chiller 8 | | | | | | | |
| Offline - Chiller 9 | | | | | | | |
| Offline - Chiller 10 | | | | | | | |
| TOTAL | 2000 | 1083 | 140 | 907 | 0.837 | 0.431 | 467 |

Primary Pumps

| DEVICE | GPM | HP | HZ | DEVICE KW | PROD GPM |
|---|---|---|---|---|---|
| Offline - Chiller 1 | | | | | |
| Offline - Chiller 2 | | | | | |
| Offline - Chiller 3 | | | | | |
| Chiller 4 | 5200 | 500 | 60 | 336 | 5200 |
| Offline - Chiller 5 | | | | | |
| Offline - Chiller 6 | | | | | |
| Offline - Chiller 7 | | | | | |
| Offline - Chiller 8 | | | | | |
| Offline - Chiller 9 | | | | | |
| Offline - Chiller 10 | | | | | |
| TOTAL | 5200 | 500 | 60 | 336 | 5200 |

Condenser Water Pumps

| DEVICE | GPM | HP | HZ | DEVICE KW | PROD GPM |
|---|---|---|---|---|---|
| Offline - Chiller 1 | | | | | |
| Offline - Chiller 2 | | | | | |
| Offline - Chiller 3 | | | | | |
| Chiller 4 | 6000 | 100 | 60 | 67 | 6000 |
| Offline - Chiller 5 | | | | | |
| Offline - Chiller 6 | | | | | |
| Offline - Chiller 7 | | | | | |
| Offline - Chiller 8 | | | | | |
| Offline - Chiller 9 | | | | | |
| Offline - Chiller 10 | | | | | |
| TOTAL | 6000 | 100 | 60 | 67 | 6000 |

Secondary Pumps

| DEVICE | GPM | HP | HZ | DEVICE KW | PROD GPM |
|---|---|---|---|---|---|
| Offline - SP - 1 | | | | | |
| Offline - SP - 2 | | | | | |
| Offline - SP - 3 | | | | | |
| Offline - SP - 4 | | | | | |
| Offline - SP - 5 | | | | | |
| Offline - SP - 6 | | | | | |
| Offline - SP - 7 | | | | | |
| Offline - SP - 8 | | | | | |
| Offline - SP - 9 | | | | | |
| Offline - SP - 10 | | | | | |
| TOTAL | | | | | |

Fig. 4E-2

Monthly Log Data Sheet

Cooling Tower Fans

| DEVICE | HP | HZ | DEVICE KW | CHECK |
|---|---|---|---|---|
| 2500 | | 41 | | |
| 2500 | | 41 | | |
| 2500 | | 41 | | |
| 2500 | 101 | 41 | 24.34 | |
| | | 41 | | Design |
| | | 41 | | Design |
| | | 41 | | Design |
| | | 41 | | Design |
| | | 41 | | Design |
| | | 41 | | Design |
| TOTAL | 101 | 41 | 24 | |

Temperatures

| | p-chws | p-chwr | cws | cwr | chw delta | cw delta |
|---|---|---|---|---|---|---|
| Offline - Chiller 1 | | | | | | |
| Offline - Chiller 2 | | | | | | |
| Offline - Chiller 3 | | | | | | |
| Chiller 4 | 41.0 | 46.0 | 71.0 | 79.0 | 5 | 8 |
| Offline - Chiller 5 | | | | | | |
| Offline - Chiller 6 | | | | | | |
| Offline - Chiller 7 | | | | | | |
| Offline - Chiller 8 | | | | | | |
| Offline - Chiller 9 | | | | | | |
| Offline - Chiller 10 | | | | | | |
| AVERAGE | 41 | 46 | 71 | 79 | 5 | 8 |

January Log 1 Summary

| DEVICE | KW | KW/TON | TONS | GPM | HP | Supply Temp | Return Temp |
|---|---|---|---|---|---|---|---|
| Chiller | 907 | 0.837 | 1083 | | | | |
| CHWP | 336 | 0.310 | | 5200 | 500 | 41.0 | 46.0 |
| CWP | 67 | 0.062 | | 6000 | 100 | 71.0 | 79.0 |
| CTF | 24 | 0.022 | | | 101 | | |
| Plant | 1334 | 1.231 | 1083 | 11200 | | | |
| VAV AHU | 0 | | | | | | |
| Total KW | 1334 | | | | | | |

Optimized

| DEVICE | KW | AVG KW/TON | GPM |
|---|---|---|---|
| Chiller | 467 | 0.431 | |
| CHWP | 191 | 0.176 | 2600 |
| CWP | 48 | 0.044 | 3250 |
| CTF | 41 | 0.038 | |
| Plant | 747 | 0.689 | 5850 |
| VAV AHU | 0 | | |
| Total KW | 747 | | |

Replacement Chiller Analysis

| DEVICE | KW | KW/TON |
|---|---|---|
| Chiller | 370 | 0.341 |
| Plant | 649 | 0.600 |
| VAV AHU | 0 | |
| Total KW | 649 | |

January Log Average

| | Plant KW | Chiller KW | Tons | CHW GPM | CW GPM | CTF KW |
|---|---|---|---|---|---|---|
| As Built | 1334 | 907 | 1083 | 5200 | 6000 | 24 |
| Demand Flow | 747 | 467 | 1083 | 2600 | 3250 | 41 |
| DF & Replacement Chiller | 649 | 370 | | | | |

January Log Average Temperatures

| CHWS | CHWR | CHW Delta | CWS | CWR | CW Delta |
|---|---|---|---|---|---|
| 41 | 46 | 5 | 71 | 79 | 8 |

Fig. 4L

Air Side Comparison

| VAV AIR HANDLER DESIGN DATA | JAN | FEB | MAR | APR | MAY | JUN | JUL | AUG | SEP |
|---|---|---|---|---|---|---|---|---|---|
|  | 0 | 0 | 0 | 0 | 0 | 0 | 0 | 0 | 0 |
| AHU CFM Calculated From Average Load | 1040000 | 1040000 | 1040000 | 1040000 | 1040000 | 1040000 | 1040000 | 1040000 | 1040000 |
|  | 728000 | 728000 | 728000 | 728000 | 728000 | 780000 | 866667 | 1040000 | 1040000 |
| AHU SAT Set Point | 55.0 | 55.0 | 55.0 | 55.0 | 55.0 | 55.0 | 55.0 | 55.0 | 55.0 |
| AHU SAT Wet Bulb Assumption | 54.9 | 54.9 | 54.9 | 54.9 | 54.9 | 54.9 | 54.9 | 54.9 | 54.9 |
| AHU SAT Enthalpy Assumption | 23.1 | 23.1 | 23.1 | 23.1 | 23.1 | 23.1 | 23.1 | 23.1 | 23.1 |
| AHU Average Monthly Load (Tons) | 1083 | 1300 | 1517 | 1625 | 1733 | 1950 | 2167 | 2600 | 2600 |
| Approximate AHU Fan Energy | 0 | 0 | 0 | 0 | 0 | 0 | 0 | 0 | 0 |
| Minimum CFM % | 70% | 70% | 70% | 70% | 70% | 70% | 70% | 70% | 70% |
| Minimum SAT | 55 | 55 | 55 | 55 | 55 | 55 | 55 | 55 | 55 |
| Wet Bulb Temperature | 54.9 | 54.9 | 54.9 | 54.9 | 54.9 | 54.9 | 54.9 | 54.9 | 54.9 |
| SAT Entahlpy | 23.1 | 23.1 | 23.1 | 23.1 | 23.1 | 23.1 | 23.1 | 23.1 | 23.1 |
| Base Line KW | 0 | 0 | 0 | 0 | 0 | 0 | 0 | 0 | 0 |
| MA Enthalpy | 27.1 | 27.9 | 28.7 | 29.1 | 29.5 | 29.8 | 29.8 | 29.8 | 29.8 |
| DF Delta Enthalpy | 4.0 | 4.8 | 5.6 | 6.0 | 6.3 | 6.7 | 6.7 | 6.7 | 6.7 |
| DF AHU CFM | 728000 | 728000 | 728000 | 728000 | 728000 | 780000 | 866667 | 1040000 | 1040000 |

Fig. 4M

Annualized Data Sheet

| AS BUILT | HOURS | PLV Tons | PLV KW | PLV KWH | ton hours | kw/ton | DOLLARS | CHW GPM | CW GPM | CHILLER KW | Chiller kw/ton | CTF | chw delta | cw delta |
|---|---|---|---|---|---|---|---|---|---|---|---|---|---|---|
| JANUARY | 558 | 1083 | 1334 | 928,393 | 604,500 | 1.231 | $120,691 | 5200 | 6000 | 907 | 0.837 | 24 | 5 | 8 |
| FEBRUARY | 336 | 1300 | 1375 | 442,423 | 436,800 | 1.058 | $57,515 | 5200 | 6000 | 933 | 0.717 | 40 | 6 | 8 |
| MARCH | 744 | 1517 | 1497 | 944,496 | 1,128,400 | 0.987 | $122,785 | 5200 | 6000 | 1056 | 0.696 | 38 | 7 | 9 |
| APRIL | 720 | 1625 | 1407 | 1,033,901 | 1,170,000 | 0.866 | $134,407 | 5200 | 6000 | 985 | 0.606 | 20 | 8 | 10 |
| MAY | 744 | 1733 | 1460 | 1,291,260 | 1,289,600 | 0.842 | $167,864 | 5200 | 6000 | 1004 | 0.579 | 53 | 8 | 8 |
| JUNE | 720 | 1950 | 1676 | 1,498,724 | 1,404,000 | 0.859 | $194,834 | 5200 | 6000 | 1198 | 0.614 | 75 | 9 | 11 |
| JULY | 744 | 2167 | 2918 | 1,780,529 | 1,612,000 | 1.347 | $231,469 | 10400 | 12000 | 1963 | 0.906 | 150 | 5 | 9 |
| AUGUST | 744 | 2600 | 2820 | 1,931,947 | 1,934,400 | 1.085 | $251,153 | 10400 | 12000 | 1865 | 0.717 | 149 | 6 | 8 |
| SEPTEMBER | 720 | 2600 | 2658 | 1,882,124 | 1,872,000 | 1.022 | $244,676 | 10400 | 12000 | 1723 | 0.663 | 130 | 6 | 9 |
| OCTOBER | 744 | 2167 | 1635 | 1,771,765 | 1,612,000 | 0.755 | $230,329 | 5200 | 6000 | 1185 | 0.547 | 47 | 10 | 10 |
| NOVEMBER | 360 | 1733 | 1472 | 662,555 | 624,000 | 0.849 | $86,132 | 5200 | 6000 | 1036 | 0.598 | 32 | 8 | 10 |
| DECEMBER | 558 | 1517 | 1627 | 519,473 | 846,300 | 1.073 | $67,532 | 5200 | 6000 | 1198 | 0.790 | 26 | 7 | 10 |
| Total / Average | 7,692 | 2,600 | 2,918 | 14,687,590 | 14,534,000 | 1 | $1,909,387 | | | | | | 7 | 9 |

| Demand Flow | HOURS | PLV Tons | PLV KW | PLV KWH | ton hours | kw/ton | DOLLARS | CHW GPM | CW GPM | CHILLER KW | Chiller kw/ton | CTF | CT APP | |
|---|---|---|---|---|---|---|---|---|---|---|---|---|---|---|
| JANUARY | 558 | 1083 | 747 | 489,826 | 604,500 | 0.689 | $63,677 | 2600 | 3250 | 467 | 0.431 | 41 | 4 | |
| FEBRUARY | 336 | 1300 | 848 | 268,890 | 436,800 | 0.652 | $34,956 | 3120 | 3900 | 561 | 0.431 | 48 | 4 | |
| MARCH | 744 | 1517 | 949 | 651,209 | 1,128,400 | 0.626 | $84,657 | 3640 | 4550 | 654 | 0.431 | 57 | 4 | |
| APRIL | 720 | 1625 | 974 | 768,268 | 1,170,000 | 0.599 | $99,875 | 3900 | 4875 | 672 | 0.414 | 61 | 4 | |
| MAY | 744 | 1733 | 1176 | 989,698 | 1,289,600 | 0.678 | $128,661 | 4160 | 5200 | 864 | 0.499 | 65 | 4 | |
| JUNE | 720 | 1950 | 1528 | 1,161,949 | 1,404,000 | 0.783 | $151,053 | 4680 | 5850 | 1116 | 0.572 | 73 | 5 | |
| JULY | 744 | 2167 | 1962 | 1,386,551 | 1,612,000 | 0.906 | $180,252 | 5200 | 6500 | 1404 | 0.648 | 81 | 5 | |
| AUGUST | 744 | 2600 | 2259 | 1,505,820 | 1,934,400 | 0.869 | $195,757 | 6240 | 7800 | 1684 | 0.648 | 97 | 5 | |
| SEPTEMBER | 720 | 2600 | 2010 | 1,460,286 | 1,872,000 | 0.773 | $189,837 | 6240 | 7800 | 1435 | 0.552 | 97 | 5 | |
| OCTOBER | 744 | 2167 | 1382 | 1,349,209 | 1,612,000 | 0.638 | $175,397 | 5200 | 6500 | 899 | 0.415 | 81 | 5 | |
| NOVEMBER | 360 | 1733 | 1019 | 473,211 | 624,000 | 0.588 | $61,517 | 4160 | 5200 | 708 | 0.408 | 65 | 4 | |
| DECEMBER | 558 | 1517 | 949 | 254,541 | 846,300 | 0.626 | $33,090 | 3640 | 4550 | 654 | 0.431 | 57 | 4 | |
| Total / Average | | | 1317 | 10,759,460 | 14,534,000 | 0.702 | $1,398,730 | | | | | | | |

| Operating Ton Hours | 14,534,000 | |
| Base Line KWH | 14,687,590 | $1,909,387 |
| Demand Flow KWH | 10,759,460 | $1,398,730 |
| Demand Flow KWH Savings | 3,142,504 | $408,526 | 21% |
| Air Side KWH Savings | 0 | $0 | 0% |
| Condenser Heat Reclaim | 17,441 | $122,086 | 10% |
| Total | | $3,838,728 |

QUALIFICATION SYSTEM AND METHOD FOR CHILLED WATER PLANT OPERATIONS

CROSS-REFERENCE TO RELATED APPLICATION

This application is a continuation-in-part of U.S. patent application Ser. No. 12/507,806 titled Demand Flow Pumping, filed Jul. 23, 2009 now U.S. Pat. No. 8,275,483.

BACKGROUND OF THE INVENTION

1. Field of the Invention

The invention relates to qualification and validation systems for equipment operating procedures, and particularly to a qualification system and method for chilled water plant operations.

2. Related Art

Building systems, industrial machinery, and other equipment consume energy to produce an output. For example, a building or campus chilled water plant utilizes electricity or other energy to produced chilled water to control the environment within the building or campus. Such equipment typically utilizes a substantial amount of energy due to its scale. Accordingly, the cost of operating such equipment is substantial. Though efforts by the equipment manufacturers and operators have reduced energy utilization by increasing efficiency, further efficiency gains may be achieved.

Efficiency gains may be achieved by reconfiguring or replacing equipment. However, this typically occurs at great cost. Thus, manufacturers and operators often attempt to evaluate the costs in comparison with the benefits of reconfiguring or replacing equipment before taking action.

From the discussion that follows, it will become apparent that the present invention addresses the deficiencies associated with the prior art while providing numerous additional advantages and benefits not contemplated or possible with prior art constructions.

SUMMARY OF THE INVENTION

A qualification system for determining the effect(s) of one or more chilled water plant upgrades is disclosed herein. The qualification system allows the effect of upgrades to be accurately determined. In one or more embodiments, the qualification system is capable of producing an accurate representation of the effect of upgrades using a reduced data set. This allows the effect of upgrades to be determined very quickly and efficiently. In addition, the qualification system may utilize various types and amounts of actual chilled water plant log data and characteristics to produce an accurate analysis for a particular chilled water plant. The qualification system may accept additional log data to reduce margins of error as desired in one or more embodiments.

The qualification system may be configured in various ways. For instance, in one exemplary embodiment, a qualification system for one or more equipment upgrades is provided. The qualification system may comprise a processor and a memory device having machine readable code executable by the processor stored thereon. The machine readable code may comprise one or more instructions for receiving specification data for one or more components of a chilled water plant, receiving load data indicating the load on one or more components of the chilled water plant for one or more periods of time, and determining one or more summarized load values for the one or more periods of time by summarizing the load data.

It is noted that the specification data may comprise design specifications for at least the chillers of the chilled water plant. For example, the design specifications may be specifications such as energy utilization, output, water supply temperatures, and water return temperatures. The load data may comprise load values for one or more components, such as chillers, of the chilled water plant. The representative log data may comprise plant log data for the components of the chilled water plant, such as pumping frequencies, fan frequencies, water supply temperatures, and water return temperatures.

The one or more instructions may also be for receiving representative log data from one or more logs of the chilled water plant, and determining idealized power utilization for the chilled water plant from the specification data and/or representative data. The representative log data may have an attribute of being log data from the one or more logs having a load value closest to at least one of the summarized load values.

It is noted that the instructions may also or alternatively be configured to calculate the idealized power utilization from the specification data and wet bulb data for a geographic location where the chilled water plant is located. The machine readable code may include one or more instructions for receiving this geographic location. The geographic location may be various geographic areas, such as states and cities for example.

The machine readable code may provide various functions. For example, the machine readable code may include one or more instructions for determining and outputting one or more differences between the idealized power utilization and current power utilization for the chilled water plant. The machine readable code may be configured to output the summarized load value for one or more periods of time to allow the representative log data to be identified.

In another exemplary embodiment, a qualification system for determining one or more effects of one or more chilled water plant upgrades may be provided. The qualification system may comprise a processor, a memory device, and machine readable code executable by the processor and stored on the memory device. The qualification system may also include one or more data input fields generated by executing the machine readable code, one or more data processing units that are part of the machine readable code, or both. These fields and processing units may be configured in various ways.

For instance, one or more first data input fields may be configured to accept empirical log data for a chilled water plant for one or more periods of time, and one or more first data processing units may be configured to generate at least one numerical value summarizing the empirical log data for the one or more periods of time. The one or more first data processing units may be configured to summarize the load data by a mathematical function such as a mean function, median function, and/or average function. The first data input fields may be configured to collect the empirical log data for monthly periods of time.

One or more second data input fields may be configured to accept representative log data comprising data selected from one or more logs of the chilled water plant having data closest in value to the at least one numerical value summarizing the empirical log data. For instance, the representative log data may be at least one set of log data having a load value closest to the at least one numerical value for at least one of the one or more periods of time.

One or more third data input fields may be configured to accept specification data for one or more components of the chilled water plant. In addition, one or more second data processing units may be configured to determine at least an idealized power utilization for the chilled water plant with at least the specification data, and to determine a current power utilization for the chilled water plant with at least the representative log data.

One or more third data processing units may be included to determine and output a comparison between the idealized power utilization and the current power utilization of the chilled water plant. In addition, one or more fourth data input units may be provided to accept location information for the chilled water plant. The idealized power utilization may then be calculated with at least the specification data and the location information. The location information may comprise at least the wet bulb data for a location of the chilled water plant.

Various methods for determining the effect of one or more chilled water plant upgrades are provided herein. For example, in one embodiment, a method for determining the effect of one or more chilled water plant upgrades using a qualification system is provided. The method may comprise inputting specification data for one or more components of a chilled water plant into one or more data inputs of the qualification system, inputting chiller load data indicating the load on one or more chillers for one or more periods of time into the one or more data inputs to calculate an average chiller load from the chiller load data for the one or more periods of time, and identifying representative log data from one or more logs of the chilled water plant. The representative log data identified may have an attribute of being data from the one or more logs having a chiller load value closest to the average chiller load for at least one of the one or more periods of time;

The method may also include inputting the representative log data identified from the one or more logs of the chilled water plant into the one or more data inputs to calculate a power utilization of the chilled water plant from the representative log data, and initializing an analysis to compare the power utilization of the chilled water plant and an idealized power utilization of the chilled water plant. The idealized power utilization may be calculated with at least the specification data and the representative log data. There may be at least twelve representative logs for a yearly period. It is noted that a running time of the chilled water plant may be adjusted to reflect actual runtime of the chilled water plant, and that the idealized power utilization may be calculated with the running time of the chilled water plant.

One or more results of the analysis may be presented to display the effect of the one or more chilled water plant upgrades. In addition, additional representative log data may be identified and inputted to increase the accuracy of the analysis. A geographic location of the chilled water plant may be inputted into the one or more data inputs to allow the idealized power utilization to be determined with wet bulb data for the geographic location.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4A illustrates an exemplary Title Page Data Sheet;

FIG. 4B illustrates an exemplary Design Data Sheet;

FIG. 4C illustrates an exemplary Reclaim Calculation Data Sheet;

FIG. 4D illustrates an exemplary Empirical Data Sheet;

FIGS. 4E-1 and 4E-2 illustrate an exemplary Monthly Log Data Sheet;

FIG. 4L illustrates an exemplary Air Side Comparison; and

FIG. 4M illustrates an exemplary Annualized Data Sheet.

DETAILED DESCRIPTION OF THE PREFERRED EMBODIMENTS

Figure 1:
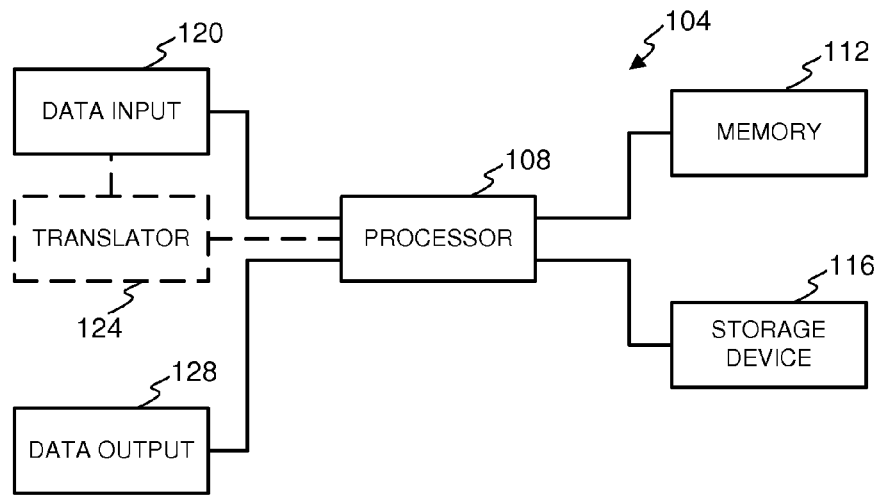
FIG. 1 is a block diagram illustrating an exemplary qualification system.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Industrial and commercial equipment systems typically comprise multiple pieces of complex machinery or devices that work in conjunction to produce a desired output. In the case of a chilled water plant for example, the output may be chilled water used to cool the air of a building, campus, or other area. Because these systems are complex and include multiple pieces of machinery, it is extremely difficult to assess their energy utilization, efficiency, effectiveness, or a combination thereof without taking direct measurements from the systems.

Likewise, the effect of potential upgrades of these systems, such as reconfigurations, retrofits or replacements of machinery are also extremely difficult to assess. Moreover, direct measurements cannot be made until the upgrades have been made. The upgrades can be time consuming and costly. Without knowing what benefits can be achieved, operators may choose to forgo the cost savings and efficiency gains from performing these upgrades.

The qualification system herein allows operators to accurately determine the effects of one or more upgrades to their systems. In addition, the qualification system provides this information quickly and easily for a variety of systems. In one or more embodiments, the qualification system can take into account particular settings or characteristics associated with an equipment system.

The qualification system is advantageous in that it may utilize actual data collected for an equipment system that is currently operating. The actual data may be inputted into the qualification system to determine the effect of an upgrade on the particular equipment system. This is highly beneficial in that these equipment systems are typically complex and unique collections of machinery. In addition, the qualification system provides varying levels of granularity by accepting different amounts of data input to determine the effect of upgrades on a chilled water plant.

In one or more embodiments, the qualification system may be configured to determine the effect of upgrades on a chilled water plant, such as those used in cooling systems of buildings, campuses, and the like. In addition, the qualification system may be configured to determine the effect of one or more particular upgrades on a chilled water plant. For example, as will be described further below, the qualification system may be configured to determine the effect of applying one or more operating strategies to the components of the chilled water plant.

Also, as will be described further below, the qualification system may be configured to determine the effect of a combination of particular upgrades. For example, the effect of applying an operating strategy in combination with the replacement of one or more components of a chilled water plant may be determined Though described herein with reference to chilled water plants and particular upgrades thereto, it is contemplated that the qualification system may be used to determine the effect of various upgrades on various equipment systems.

The qualification system may be implemented in or as a computing device. It is contemplated that a general purpose computer or computing device may execute machine readable code to provide the qualification system as described herein. Alternatively or in addition, a special purpose computing device, such as with processors and/or circuitry configured to provide the qualification system as described herein.

FIG. 1 illustrates an exemplary qualification system and exemplary components of the system. It will be understood that various of the components may be included in the qualification system in different embodiments. As can be seen, the qualification system 104 may comprise a processor 108, a data input 120, and an output device 128. In general, the processor 108 performs one or more instructions on inputted data to determine the effect of an upgrade on a chilled water plant. Data output may be generated as a result of performing the instructions on the inputted data. The processor 108 may also execute one or more instructions to collect or receive data input and to present data via an output device 128.

The instructions may be machine readable code, such as in the form of software fixed on a tangible medium accessible to the processor 108. The instructions may also or alternatively be hardwired into the processor 108, such as by including the instructions in the processor's circuitry. For example, in the case of a FPGA (Field Programmable Grid Array) type processor, the processor 108 may be physically configured according to the instructions.

The qualification system 104 may include a memory device 112, a storage device 116, or both in one or more embodiments. The memory device 112 may be system memory such as RAM memory or ROM memory. The instructions may be stored on the memory device 112 for retrieval and execution by the processor 108. In addition, the memory device 112 may be used to store data collected or used by the qualification system in operation.

The storage device 116 may be configured to store data. For example, a storage device 116 may be a magnetic drive, optical drive, flash drive, or the like. The storage device 116 may be used to store inputted data, data output, or both. In addition, the storage device 116 may store the instructions executable by the processor 108 to determine the effect of one or more upgrades on a chilled water plant. It is noted that a storage device 116 may be remote from the processor 108 but accessible to the processor in some embodiments. For example, the storage device 116 may be accessible via a network.

It will be understood that since the memory device 112 and the storage device 116 may be used to store data for later retrieval, they may be used interchangeably in one or more embodiments. For example, a memory device 112 may be used to store inputted data, data output, or both. In addition, in some embodiments, only a memory device 112 may be provided or only a storage device 116 may be provided.

Data relating to a chilled water plant may be received by the processor 108 through a data input device 120. In general, this data input will typically relate to specifications or operating characteristics of the chilled water plant, its components, and its environment. The data input 120 may be configured in various ways. For example, the data input device 120 may be a keyboard, touch screen, voice interface, scanner, or other input device. Some data input devices 120 may be at least partially automated to speed the process of data entry. For example, a scanner may automate the process of entering data values from plant logs by recognizing alphanumeric or other characters and providing this information to the processor 108.

A data input device 120 may also communicate with other devices to obtain data relating to a chilled water plant. For example, in one embodiment, the data input device 120 may communicate with a controller (or the like) of a chiller, condenser, VFD (Variable Frequency Drive), fan, or other component of a chilled water plant to retrieve operating data directly from the controller. As another example, the data input device 120 may communicate with a remote storage device to retrieve (e.g., download) data relating to a chilled water plant. To illustrate, electronic logs may be downloaded from a computer or other device storing chilled water plant data and provided to the processor 108.

In some embodiments, an optional translator component 124 may be provided to convert data received by the data input device 120 into a format usable or recognizable by the processor 108. The translator component 124 may be a separate component and/or may be implemented in one or more instructions or machine readable code executable by the processor. The translator component 124 is beneficial in that it allows the qualification system 104 to utilize a variety of input data. For example, an electronic log of a first format may be converted into a format usable by the processor 108. To illustrate, the translator component 124 may identify particular data fields and provide the data therein to corresponding fields in a data format usable by the processor 108.

An output device 128 may also be provided in one or more embodiments of the qualification system 104. In general, the output device 128 allows the effects of one or more upgrades to various aspects of chiller plant operations to be presented to a user. For example, the output device 128 may be a screen or monitor. Alternatively or in addition, the output device 128 may be a printer. In some embodiments, the output device 128 may be configured to communicate output from the processor 108 to other devices. For example, the output device 128 may be a communication device configured to send output from the processor 108 to a computer, terminal, PDA, or the like for storage, viewing, and other uses.

Figure 2:
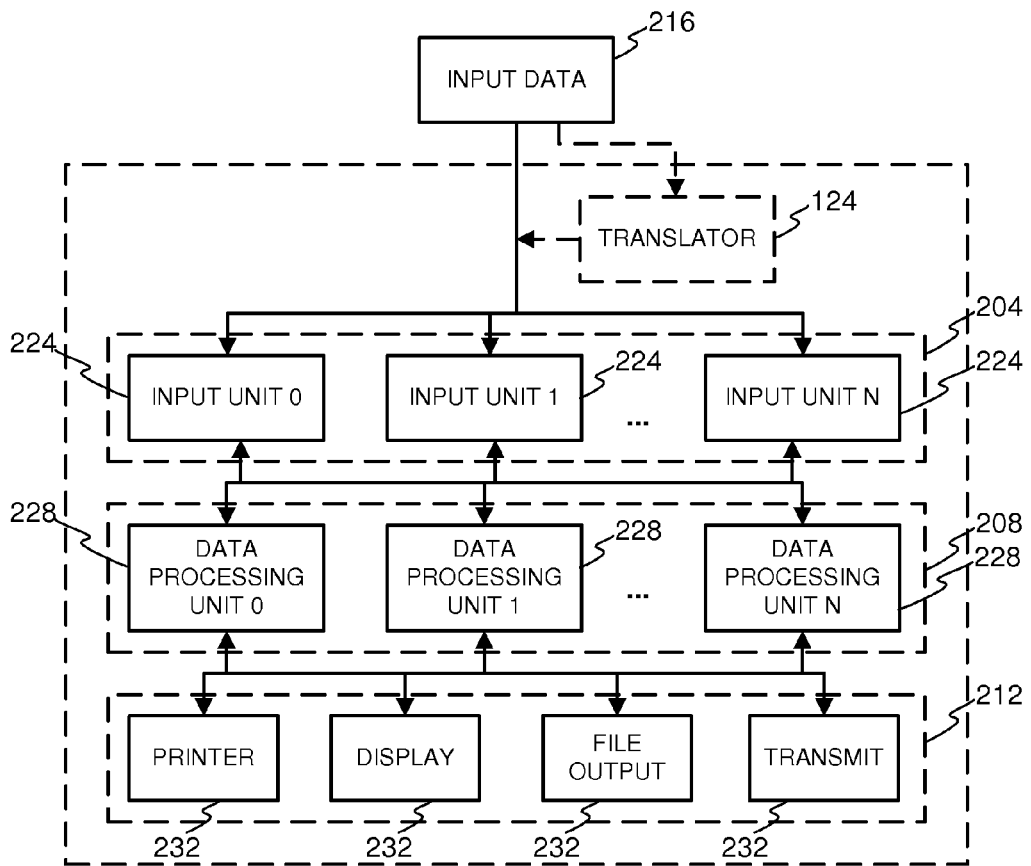
FIG. 2 is a block diagram illustrating exemplary machine readable code of a qualification system.

FIG. 2 illustrates an arrangement of various components of the one or more instructions or machine readable code executable by the processor to determine the effects of one or more upgrades on chiller plant operations. It will be understood that a processor of the qualification system may be configured (e.g., hardwired) to implement the instructions or machine readable code as well, in some embodiments.

In general, the instructions may have an input module 204, a data processing module 208, and an output module 212. In one or more embodiments, the instructions may provide a plurality of one or more of these modules. Generally speaking, when in operation, an input module 204 receives data which may be processed by a data processing module 208 to produce output which may be displayed or otherwise made accessible by the output module 212. As can be seen, each module may comprise one or more units. It is contemplated that the units may be configured to perform the same function or to perform different functions. For example, the input module 204 may include one or more input units 224. Individual input units 224 may collect the same input or collect different input. Likewise, the data processing module 208 may comprise one or more data processing units 228 which perform the same or different operations on data from the input units 224. This is beneficial in that it allows different inputs to be processed in different ways, as will be described further below.

The data processing module 208 may communicate with the output module 212 to present or otherwise allow the processed data to be accessed. The output module 212 may also include one or more individual output units 232 which may present processed data in the same or different ways. For example, the output module 212 shown includes output units 232 associated with presenting data on a printer or display screen. The output module 212 could include a plurality of units 232 for the same type of output (e.g., two printer output units). In addition, the output module 212 may comprise output units 232 for writing data files (e.g., saving/storing files), and for transmitting processed data to other devices where the data may be viewed, processed further, or otherwise used.

Typically, the qualification system will utilize data from a chilled water plant's operations or data log(s), among other data. The qualification system may also utilize other data related to a chilled water plant, such as equipment specifications and operating characteristics. The log data 216 may be directly provided to the input module 204, such as through one or more input units 224. For example, a user may enter log data into the qualification system, such as through a keyboard or other data input device and such log data may be received by the input module 204 through an input unit 224. Optionally, in some embodiments, the log data 216 may be converted to a usable format by one or more translators 124 for use by the input module 204, such as described above.

It is contemplated that one or more input units 224 may be configured to receive particular types of log data 216. For example, some input units 224 may be configured to receive integer values while others are configured to receive percentages, decimal values, text, or a combination thereof.

In one or more embodiments, the input units 224 may be organized to provide a logical organization for entering data. In one embodiment, one or more input units 224 may be organized on data sheets. In general, data sheets may be configured to collect a particular type or particular types of information. For example, as will be described below, there may be one or more data sheets for collecting title page data, chiller plant design data, annual profiles data, empirical data, and site visit log data. In this manner, the data sheets provide an organized way for entering data.

On a data sheet, the input units 224 may be represented by one or more input fields which allow data entry or input. For example, the input units 224 may be represented by a text or numerical input fields 404, such as shown in FIGS. 4A-4M. In some situations, an input unit 224 may be represented by multiple input fields. For example, one input unit 224 may be configured to collect the full name of an employee with a first name input field and a last name input field. In fact, if desired, an input unit 224 may have multiple input fields configured to collect all desired employee information for a title page sheet. To illustrate, an input unit 224 may have an associated first name, last name, and employee number field to collect this information from an employee utilizing the qualification system. It will be understood that an input field 404 may be used to present/output data in some embodiments because the input field may present whatever information has been inputted therein.

Likewise, output units 232 may be organized and represented on a data sheet as well, such as by one or more output fields 412 which display information on a data sheet, such as shown in FIGS. 4A-4M. In one or more embodiments, the output fields may display information resulting from one or more calculations or operations performed by the data processing units 228. As will be described below, the calculations may be performed on data from input units 224, previous calculations, or other sources. For example, an average may be calculated by a data processing unit 228 by summing data from a plurality of input fields and dividing by the number of input fields. The calculated average may then be displayed through an output unit 232 as represented on a screen (or other output device) by an output field.

In one or more embodiments, the data sheets, input fields, and output fields may be generated, such as by a processor, and presented on a display. In this manner, a graphical user interface may be provided for the input and output of data. It is noted that a variety of input fields, output fields, or combined input/output fields are shown in the figures even though, for the purposes of clarity, each of these fields have not been individually labeled in the figures. These fields may collect data, present data, or both in one or more embodiments.

To illustrate the interaction between the data processing units 228 and the input units 224 and output units 232, the following exemplary procedure is provided. In general, this exemplary procedure may execute when the qualification system is started in order to prepare the qualification system for operation or use by preparing input and output fields of the qualification system. Note that in the following code listing, portions delineated by "/*" and "*/" are comments and not executable.

In one or more embodiments, the procedure provided, as well as other sets of instructions or machine readable code, may implement one or more of the data processing units 228. As will be seen in the following, such data processing units 228 may utilize data from one or more input units 224 or input fields and present data via one or more output units 232 or output fields. Though the following data processing unit 228 is written in Visual Basic for Applications (trademark of Microsoft Corporation) for execution in a Microsoft Excel (trademark of Microsoft Corporation) workbook, it will be understood that various programming languages may be used. Reference may be made to FIG. 4B and the city and state fields illustrated therein to aid in understanding the following.

```
Private Sub Workbook_Open( )
/*Display the design sheet when the workbook is opened.*/
    Sheets("Design").Select
/*Clear the contents of combo box 1 on design sheet (state combo box).
Set the initial value of combo box 1 and 2 (state and city) to the values
contained in the cells hidden beneath them. This is the method for storing
and retrieving the contents of the combo boxes when the file is closed.*/
    Sheet1.ComboBox1.Clear
    Sheet1.ComboBox1.Value = Sheets("Design").Range("B1").Value
    Sheet1.ComboBox2.Value = Sheets("Design").Range("E1").Value
/*Declare variables and assign state abbreviations to array for population
into combo box 1.*/
    Dim Count As Integer
    Dim States
    States = Array("AK", "AL", "AR", "AZ", "CA", "CO", "CT", "DE",
"FL", "GA", "HI", "IA", "ID", "IL", "IN", "KS" "KY", "LA", "MA",
"MD", "ME", "MI", "MN", "MO", "MS", "MT", "NC", "ND", "NE",
"NH", "NJ", "NM", "NV", "NY", "OH", "OK", "OR", "PA", "RI",
"SC", "SD", "TN", "TX", "UT", "VA", "VT", "WA", "WI", "WV",
"WY")
/*Loop to add each state as an item in combo box 1.*/
    For Count = 0 To 49
        Sheet1.ComboBox1.AddItem (States(Count))
    Next
/*Initialize variable and loop through each row on a state/city data sheet
("WB Data"). If the a row's state column matches the state selected in
combo box 1, add the city to combo box 2 to allow the user to select a city
within the state of combo box 1.*/
    Dim CityRow As Integer
    For CityRow = 5 To 757
        If Application.Sheets("WB Data").Range("A" &
CityRow).Value = Sheet1.ComboBox1.Value Then
            Sheet1.ComboBox2.AddItem (Application.Sheets("WB
Data").Range("B" & CityRow).Value)
        End If
    Next
End Sub
```

Thus, in operation, this data processing unit 228 fills a state combo box with fifty states for selection by a user. In this way, the data processing unit 228 is utilizing the state combo box as an output field. It is noted that, in some cases, input fields may function as output fields, and vice versa. For example, the data processing unit 228 may then utilize the state combo box as an input field. For example, the user may select the state in which the chilled water plant is located. This information may then be used by the data processing unit 228 to fill a city combo box with the cities of that state. In this way, the city combo box may be used as an output field.

As will be described further below, the selection of a state and city may be used to automatically fill in particular information. For instance, wet bulb data for a particular state and/or city may be automatically filled in with predefined wet bulb information when the user selects a city. In one or more embodiments, the data processing unit 228 may also perform the function of automatically filling in the wet bulb information upon accepting a user selection of a city. In this manner, it can be seen that the city combo box may also be used as an input field.

Figure 3:
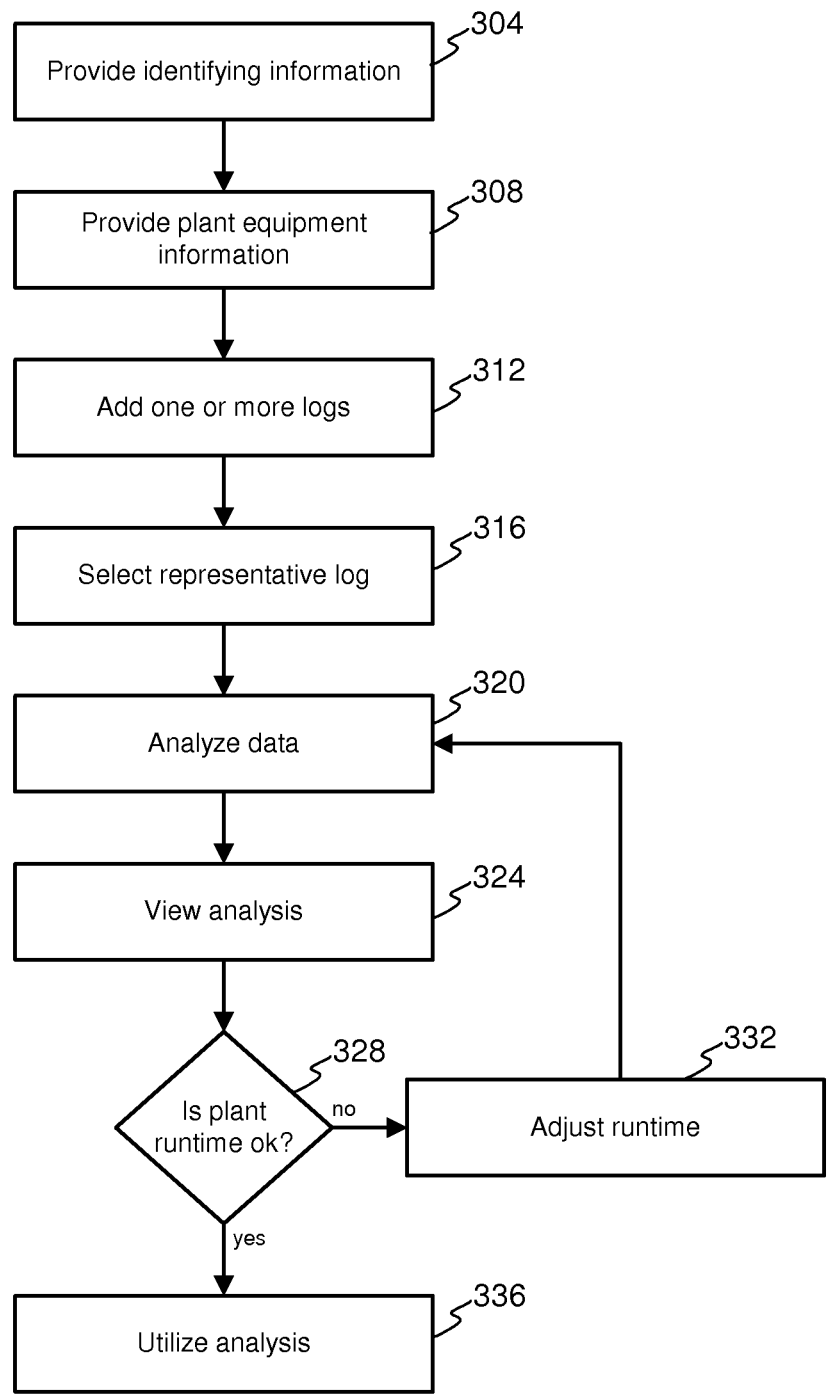
FIG. 3 is a flow diagram illustrating an exemplary processes for analyzing log data.

An exemplary process the qualification system may follow to provide an analysis of the effect of one or more upgrades on a chilled water plant will now be described with regard to FIG. 3. In the following description, reference may be made to FIGS. 4A-4M, which illustrate exemplary data sheets that may be used to collect and present data relating to a chilled water plant undergoing analysis.

Though some portions of the following are described in a sequence or order, it will be understood that data may be entered in various sequences. For example, data may be entered into various portions of a data sheet in various sequences. The arrangement of the input fields illustrated in the figures is exemplary and various data sheet formats/layouts may be utilized in different embodiments of the qualification system.

At a step 304, data may be entered into a "Title Page" or the like. FIG. 4A illustrates an exemplary Title Page Data Sheet. The Title Page Data Sheet may be thought of as a cover page in one or more embodiments. The Title Page Data Sheet may be used to provide the qualification system with plant and personnel information for a particular chilled water plant or multiple chilled water plants. As can be seen, a name for the target site (i.e., the site where the chilled wager plant is located) and its address may be entered into corresponding input fields 404 of the sheet. In addition, it can be seen that the input fields 404 may have associated labels 408 to help identify what data or information should be entered into the fields. In the Title Page Data Sheet shown, equipment manufacturer model and serial numbers may be entered to identify the equipment of a chilled water plant. Information collected in the Title Page Data Sheet is beneficial in that it allows a chilled water plant and analysis performed on the chilled water plant to be readily identified in the future.

At a step 308, details or data describing chilled water plant equipment, such as equipment specifications, may be inputted. FIG. 4B illustrates an exemplary Design Data Sheet which may be used to collect such input. In general, specifications data is typically collected on the Design Data Sheet. For example, in one or more embodiments, the Design Data Sheet may be configured to collect various design specifications for chillers, cooling towers, pumps, and other components of a chilled water plant. Wet bulb data may also be collected. As can be seen, information may be entered for various periods of time. For example, the wet bulb data (as well as other information) may be collected on a monthly basis or for other periods of time. It is noted that equipment names, the leftmost column in each equipment section, may be customized if desired, such as to allow plant equipment to be more easily identified.

It is noted that the Design Data Sheet of FIG. 4B illustrates that at least some of the input fields 404 of a data sheet may be automatically filled in as a result of previous input. For example, by selecting a state from the drop down input field 404 in the upper left corner, the city drop down input field 404 may be automatically populated with the cities in that state. This populating may occur through one or more data processing units (such as the Workbook_Open( ) data processing unit described above). Likewise, selection of a city may automatically insert wet bulb data for that city into the corresponding input fields 404, output fields 412, or both on the same data sheet or other data sheets. For instance, in the Design Data Sheet of FIG. 4B, selection of a city may cause a data processing unit to fill in the monthly wet bulb data, as shown in the Wet Bulb Data section of the sheet.

In some embodiments, a plant name, e app and c app, and date may be entered such as in the Design Data section of the Design Data Sheet. The plant name field may accept an identifier used to reference the chilled water plant. The e app and c app fields may respectively accept design evaporator and condenser evaporator approach values. A date value may be inputted into the date field. Typically, the current date will be inputted into the date field.

As stated, specification data for the chilled water plant's chillers may be collected. One or more chillers of the chilled water plant may be identified, such as by entering a device name for one or more of the chillers. This can be generic, for example "Chiller 1" or "C1", but it is recommended that it be descriptive. For example, the chiller's manufacturer and model number could be used. Other information, such as specifications and operating characteristics, may be collected as well. For example, the design chiller tonnage and the design chiller RLA (Rated Load Amps), followed by chiller power factor may then be entered for each chiller in the chiller section. Chiller voltage may also be collected.

Primary Pump Horse Power (PP HP) and Primary Pump Gallons Per Minute (PP GPM) may be collected as well. A value for Primary Pump Load Factor (PP Load Factor) may be collected as well. It is noted that some values may have automatically provided default values that may be changed if desired. For example, if a value differing from a default PP Load Factor is desired, such value may be entered.

The next three columns of input fields, as shown in the Design Data Sheet, may accept additional specifications data for other components of the chilled water plant. For example, specifications for one or more condenser water pump(s) may be collected such as, Condenser Water Pump Horse Power (CWP HP), Condenser Water Pump Gallons Per Minute (CWP GPM), and Condenser Water Pump Load Factor (CWP Load Factor), if desired, to be entered. It is noted that these values may be required in one or more embodiments for the purpose of an accurate analysis or calculation.

Corresponding temperatures for chilled water plant components may be received. For example, as shown by the next four columns of input fields 404 on the Design Data Sheet, one or more input fields 404 in a column or another layout may accept evaporator supply, evaporator return, condenser supply, and condenser return temperatures. A refrigerant may be identified as well. In some embodiments, the user may be provided a preset list of values for some input fields 404. For example, the user may click on an input field 404 in the refrigerant column and a drop down list may appear including a predefined selection of one or more refrigerants. The user may select the refrigerant that the corresponding chiller is using. Exemplary refrigerants include R-134A, R-22, R-123, and R-11.

A calculation method to use for chiller KW calculations on the log sheets may be selected. Various predefined calculation methods may be provided. Exemplary calculation methods include RLA, % RLA, KW, and Design. The RLA calculation method may calculate the chiller KW based on the RLA entered, while % RLA may use data from the design sheet along with the entered % RLA to calculate chiller KW. The KW method will allow the user to directly enter the chiller KW from the plant log sheets. The design calculation method may utilize calculations on the Chiller Data Sheet, described below, to estimate a chiller's KW/Ton profile and used this equation to calculate chiller KW.

The above process may be repeated for each chiller in a chilled water plant. For example, in the layout of the illustrated Design Data Sheet this would occur by filling in the rows of information corresponding to each chiller. Data for an optional replacement chiller may be entered as well, such as shown below the tenth chiller row in FIG. 4B. By default this data may be set to the data provided for the first chiller (e.g., Chiller 1), but the user may change this to correspond with the specifications of a potential replacement chiller. This allows the qualification system to determine the effects of installing the replacement chiller.

Specification data may include data for one or more secondary pumps. For instance, the Design Data Sheet shown includes a Secondary Pumps section for collecting such information. In this section, pump names may be entered in the same manner as for the chillers. In one or more embodiments, the secondary pumps may require values for Horse Power (HP), Gallons Per Minute (GPM), and Secondary Pump Load Factor (SP Load Factor) to be collected/inputted. Of course, default values or estimated values may be provided in some embodiments. These values may be entered for each pump. This process may be repeated until the data for all pumps has been entered.

Cooling tower specification data may also be collected. For example, as shown, a Cooling Tower Fans section is provided to the right of the Secondary Pumps section to collect this data. Like the chillers and pumps above, the cooling tower fans may be named as desired. The Horse Power (HP) and Efficiency Percent (Eff %) data may be entered for a cooling tower fan. Similar to the above, this data collection process may be repeated for each cooling tower fan in the system.

As stated, portions of a data sheet may be used to present information, such as in the form of one or more output fields 412. For example, the output of a calculation may be displayed. As illustrated in the Chiller Efficiency section found to the right of the Cooling Tower Fans section, this portion of the Design Data Sheet may comprise one or more output fields 412 to display calculations based on the data entered in the Chiller or other section(s) of the data sheet. It is noted that an output field 412 may display information based on/calculated from data of other data sheets in one or more embodiments.

In one or more embodiments, wet bulb information may be included as part of the specification data. This may be collected in various ways. For example, as shown in the Design Data Sheet, one or more fields corresponding to a Wet Bulb section (located to the right of the Chiller Efficiency section) may be provided. These fields may be configured to, by default, contain wet bulb information corresponding to the city or other location of the chilled water plant, such as selected by the user as described above. However, if desired, custom wet bulb information may be entered here. For example, NOAH wet bulb information or other custom wet bulb information for each month of a year (or other periods) may be inputted by a user if desired.

Specification data may include cooling tower approach values in one or more embodiments. These values may be provided by default as part of the wet bulb information for the city or other location of the chilled water plant. It is noted that any desired or necessary modifications to the cooling tower approach values for each month may be made. All values may be estimated based on a value for a particular month. For example, values may be estimated for the month of August in one or more embodiments. Total design head data may be collected as part of the specification data in one or more embodiments. For example, the Primary Pump Total Design Head (PP TDH), Secondary Pump Total Design Head (SP TDH), and Condenser Water Pump Total Design Head (CWP TDH) may be entered, such as in the block of input fields 404 to the right of Cooling Tower Approach in the illustrated Design Data Sheet.

Specification data may also include energy utilization/cost data. For example as shown by the Energy Costs section of the illustrated Design Data Sheet, energy cost data such as Annual Total Dollars (gas costs per dekatherm) and the Annual Total KWH input fields to be collected. Alternatively or in addition, the Provided Dollar Per KWH may be collected. It is noted that if anything is entered in the Provided Dollar Per KWH field, the Annual Total Dollars and Annual Total KWH fields may be ignored, and subsequent calculations may be made utilizing only the Provided Dollar Per KWH field value in one or more embodiments.

An Air Side Data section, or the like, may be provided to collect specification data comprising air side data. Here, the Variable Air Volume Horse Power (VAV HP) and the Air Handler Unit Efficiency Percent (Eff %) may be entered. A margin of error may be entered to the right of the AHU Data section. This amount may then be subtracted from the benefits of one or more upgrades to the chilled water plant (e.g., energy savings) in order to provide a margin of error in the calculated effects of one or more upgrades on the chilled water plant. Users may then view the analysis of the qualification system according to various margins of error and weigh this information in making the decision to perform or not perform one or more plant upgrades.

Referring now to FIG. 4C, in some plant configurations, a portion of heat returning to the plant from a building (or the like) may be reclaimed and used for other purposes. To illustrate, FIG. 4C illustrates an exemplary Reclaim Calculation to Data Sheet where a value, such as a percentage of heat, may be entered to calculate energy savings from reclamation of such heat. This calculation may take into account the effect of one or more plant upgrades in some embodiments. As shown in the exemplary data sheet of FIG. 4C, a data processing unit associated with the "% Reclaim" input field 404 is configured to calculate the amount of natural gas that may be saved.

The qualification system may verify that all of the required data has been entered for each plant component that that has been added to the sheet. For example, an input field's input unit and/or associated data processing unit may verify that any required data has been filled in. In addition, the input units and/or data processing units may verify that the data is in a proper format and/or within an acceptable range, where applicable. This is advantageous because missing data on a data sheet, such as the Design Data Sheet, may result in missing data in the log sheet calculations and incomplete or inaccurate final plant analysis. It is contemplated that the system may notify the user when required or recommended data (e.g., data that will improve accuracy of an analysis) has not been entered. The system may also prompt the user to enter this data. In addition, in one or more embodiments, calculation of the effect of one or more upgrades may not commence until required data has been inputted. Where recommended data has not been entered, the system may provide a warning to the user of the same.

At a step 312, chilled water plant log data may be entered in one or more embodiments. Typically, the log data collected at this stage will be a subset of log data which may be used to identify additional log data to be collected for an analysis of a chilled water plant.

As shown in FIG. 4D, an Empirical Data Sheet or the like may be used to collect the log data just described. This log data may be thought of as "first stage" or empirical log data in that it may be used by the qualification system to identify additional log data or representative log data. An Empirical Data Sheet, or the like, is advantageous in that collects/processes first stage log data and allows the system and/or the user to then identify one or more plant data logs that are representative of the plant's operation for each month. Stated another way, the information collected via an Empirical Data Sheet, or the like, may be used to assist the user in identifying one or more representative logs to be used in analysis of a chilled water plant.

Typically, each log entry of a chilled water plant's data log contains a large amount of data. The Empirical Data Sheet allows a subset of this data to be entered at this stage. This is highly beneficial in that only a subset of the log data is necessary to identify the representative log entry. In one or more embodiments, log data representing a single attribute of a chilled water plant may be collected. As can be seen, this is a significantly smaller amount of data. For instance, only chiller tonnage or chiller energy utilization for one or more chillers, may be collected in one or more embodiments. It is contemplated that log data representing multiple attributes of a chilled water plant's operation may be collected in some embodiments. For example, chiller tonnage and chiller energy utilization may be collected in some embodiments. As will be described below, this "first stage" information may then be used to identify additional or representative log data which may then be inputted to determine the effect of one or more chilled water plant upgrades.

In one or more embodiments, empirical log data may be collected for various periods of time. For example, in one embodiment, for one or more (or all) chillers in a plant, the Empirical Data Sheet may contain one or more input fields 404 for each day of a year. As stated, the input fields 404 may be configured to collect a relatively small amount of information to allow a representative log or logs to be identified with a reduced amount of data entry. For example, in the embodiment of FIG. 4D, chiller load information (such as chiller tonnage or chiller energy utilization), from the plant logs, may be entered in the corresponding time period and chiller field. It is noted that though shown with daily periods of time, the Empirical Data Sheet may contain input fields corresponding to various periods of time other than a day. For example, in some embodiments, the fields may correspond to hourly, weekly, monthly, or other periods of time.

Empirical or first stage log data may be summarized to help in identification of representative log data. For example, in the embodiment of FIG. 4D, first stage log data comprising chiller load values may be summarized into a single value or a reduced number of values. The reduced number of values make it easier to identify representative log data because there are a smaller number of values to compare in identifying the representative log data. In addition, all of the chiller energy information for a given month may be entered into an Empirical Data Sheet.

Summarizing the empirical data may occur in various ways and may be performed by one or more data processing units. For example, the chiller load values, such as chiller tonnage or energy utilization, may be added and/or displayed, such as by a data processing unit (as they are entered or after they are entered). For example, in FIG. 4D, the total is the sum of the individual chiller loads and may be calculated and displayed in the column of output fields 412 titled "Total". In addition or alternatively, chiller load values may be summarized by calculating an average value, mean value, median value, or the like for the load values of one or more chillers. In the exemplary Empirical Data Sheet for example, the summary or average for each month may be calculated and displayed in the "Month Average" column, such as by calculating an average of each day or other period's data values. Sums, averages, means, medians, or other summarization of empirical data values may occur for various periods of time other than those shown.

At a step 316, representative log data from the chilled water plants logs may be identified and/or selected. The identified/selected log may be thought of as an "average" log selected from multiple logs in a given month. As stated, the representative log data may be identified by the empirical or first stage log data, or one or more summaries thereof. Once identified, a representative log is advantageous in that it allows analysis of a chilled water plant to be completed quickly, accurately, and efficiently. Each day of a chilled water plant's logs may contain substantial amounts of information, so much so that to enter this information would at the very least be cumbersome. In addition, the time and costs involved in entering this information would typically be very high. Use of a representative log means that a smaller and more manageable subset of this information may be entered to perform the analysis.

For example, in one or more embodiments, detailed information from a log entry corresponding to a single day of operation may be used to represent an entire month. This allows an analysis to be set up and executed to obtain its results quickly because only data from a representative log or logs need be entered. Chilled water plant operators may then make informed decisions regarding upgrades or other modifications to their equipment. Moreover, the representative log data contains actual data from a chilled water plant's operation thus improving the accuracy of the qualification system's analysis for the particular chilled water plant.

Identification of representative log data from a chilled water plant's logs may occur in various ways. For example, to identify representative log data that represents chilled water plant operation or chilled water plant component operation for a period of time, log data similar to the summarized empirical log data may be selected. To illustrate, representative log data for a particular month may be log data for a particular day (or other period) that is as close as possible to the summarized empirical data. For example, a set of log data for a day (or other period) having the same or a similar chiller load value as the monthly average chiller load value (summarized from the empirical log data) may be identified as representative log data. Alternatively, the set of log data having the closest chiller load value may be identified as representative log data. It is noted that the sets of possible log data from which representative log data is to be chosen may correspond to the time period of the summarized empirical log data. For example, representative log data may be identified from log data for January with a summarized empirical data value for the month of January. In this manner, representative log data can be identified and used to represent operation of a chilled water plant for a larger period of time.

It is noted that the qualification system may be configured to accept additional representative log data, such as to reduce the margin of error in performing an analysis. In fact, in some situations all or a substantial portion of the representative log data may be inputted. It is also contemplated that all log data may be used in performing an analysis in some situations. For example, log data for each day of a year or other period may be entered into the qualification system. Though entering additional representative log data increases time consumption, it is beneficial in that it permits plant operators to confirm the analysis provided by running the qualification system on a smaller amount of representative log data. To illustrate, a first analysis may be run with a reduced amount of representative log data, and a second analysis may be run with an increased amount of representative log data prior to actual (and likely costly) implementation of the actual upgrades/changes to a chilled water plant.

As shown by FIGS. 4E-1 and 4E-2, one or more Monthly Log Data Sheets or the like may be included to collect representative log data for each month. The representative log data may be collected for various other periods of time. This keeps the data divided into monthly data sheets for manageability. Each of the Monthly Log Sheets may be configured similarly or be the same. Thus, the same or similar process may be used for completing each month (e.g., January through December), or other period.

FIGS. 4E-1 and 4E-2 shows that a data sheet may have one or more buttons which, when activated, perform a function. For example, a Monthly Log Data Sheet may have an "Add Log" button 416 or the like to allow users to add a log point to the current month. In other words, pressing or clicking Add Log may add one log point to the data sheet. A date input field 404 may be provided to collect the date that the plant data was logged. This input field is typically important to one or more calculations, so it is noted that an estimate on the date should be avoided if possible. The exact date from the representative plant log is preferable.

Other data from a representative plant log may then be entered. As can be seen, the chiller names collected via the Design Data Sheet may be displayed on the left in one or more output fields. The calculation method may also be displayed. The value that corresponds to the calculation method selected on the design sheet may be entered in the field associated with the chiller in the Value column. In some embodiments, this may be automatically filled in by the system. Various temperatures from the representative data log may be entered in their corresponding columns. For example, chiller water supply (P-CHWS) and return (P-CHWR) temperature, and condenser water supply (CWS) and return (CWR) temperature.

A Primary Pumps section or the like may be provided to collect information for one or more primary pumps. Some of the fields in this section may be filled with default values provided or calculated by the qualification system. Here, the frequency or hertz of each Primary Pump (PP HZ) may be entered if a value other than the default value is desired. This may be repeated for the Condenser Water Pumps (CWP HZ) and Secondary Pumps (SP HZ) by filling in the applicable sections. A Cooling Tower Fan Hertz (CTF HZ) can be entered if it differs from the calculated value.

The qualification system may then calculate various operating values. For instance, as shown, values for the chillers, primary pumps, condenser water pumps, secondary pumps, and cooling tower fans may be calculated. Log averages for the month may also be calculated. One or more data processing units coupled with the related input units may perform the calculations. The results may then be displayed via one or more output fields. It is noted that, as stated above, the user may be notified if there is any missing required information to help ensure all necessary information is entered by the user.

It is noted that if a replacement chiller analysis (e.g., analysis of a chilled water plant where one or more of its chillers is replaced) is desired, information regarding the replacement chiller may be provided. For example, the KW/Ton and/or other specifications or operating characteristics of a replacement chiller may be entered in the Replacement Chiller Analysis section.

To add another log to the current month (or other period of time), the "Add Log" button 416 may be pressed again. In order to remove a log, a "Remove Log" button 420 or the like may be pressed. In one embodiment, the user may select the logs he or she would like to remove. Removing a log will remove all data entered into that log, so users should be certain before removing a log. A "Goto Log" button 424 or the like may be configured to allow users to view a particular log in the month. For example, in one embodiment, to go to "Log 5", a user may click Goto Log and select the desired log from a list of logs.

The user may input representative log data for other months in like manner. In one embodiment, the user may click a "Next" button 428, "Previous" button 432, or the like at the top of the sheet or otherwise select another month's sheet or tab. It is noted that the months need not be completed in any particular order. It is also noted that an analysis may be performed with less than a full year's or less than twelve months of log data. However, the analysis is typically more accurate when more data is provided. In one or more embodiments, there may preferably be data from at least twelve representative logs (e.g., one per month) entered in order to perform an accurate analysis.

Figure 4F:
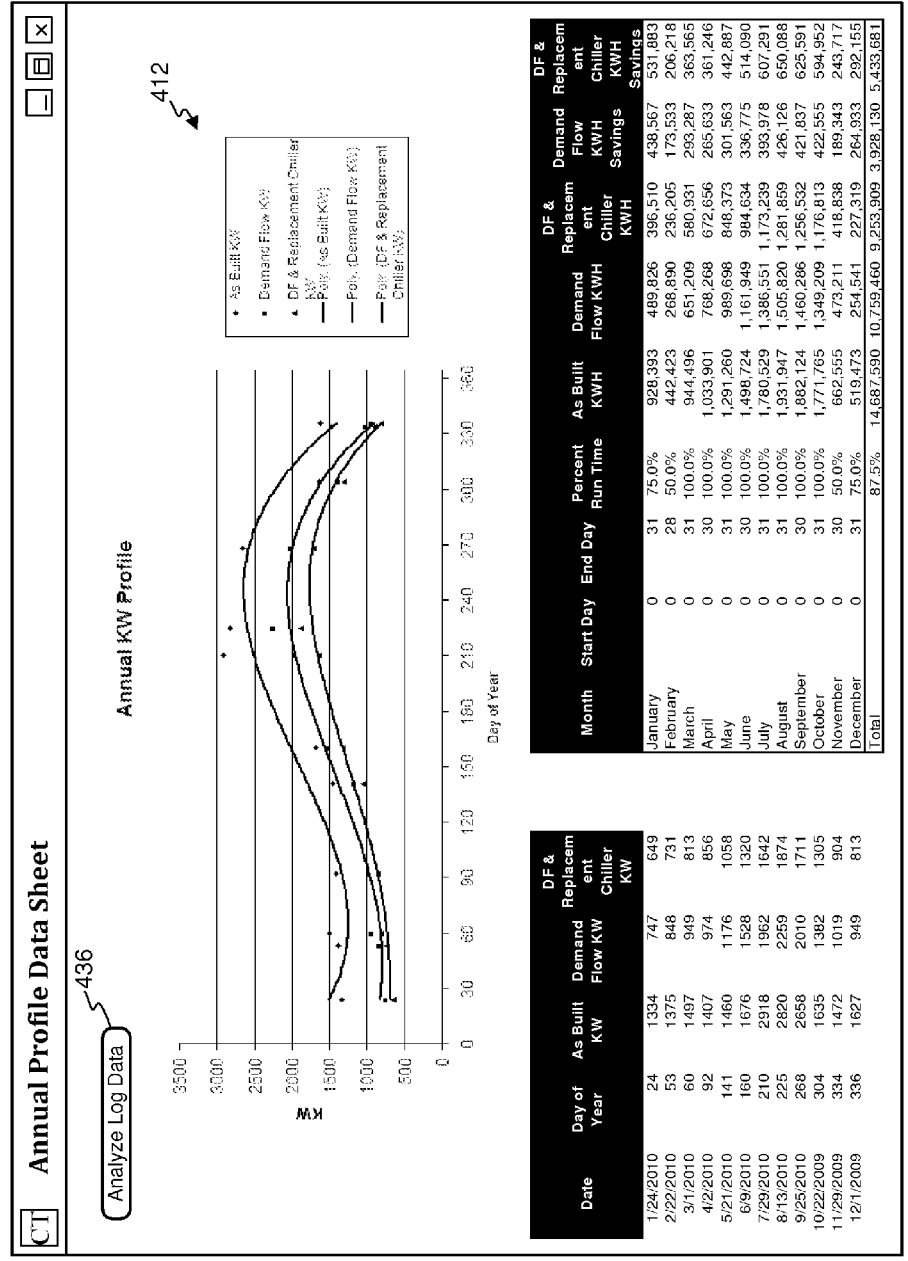
FIG. 4F illustrates an exemplary Annual Profile Data Sheet.
Figure 4G:
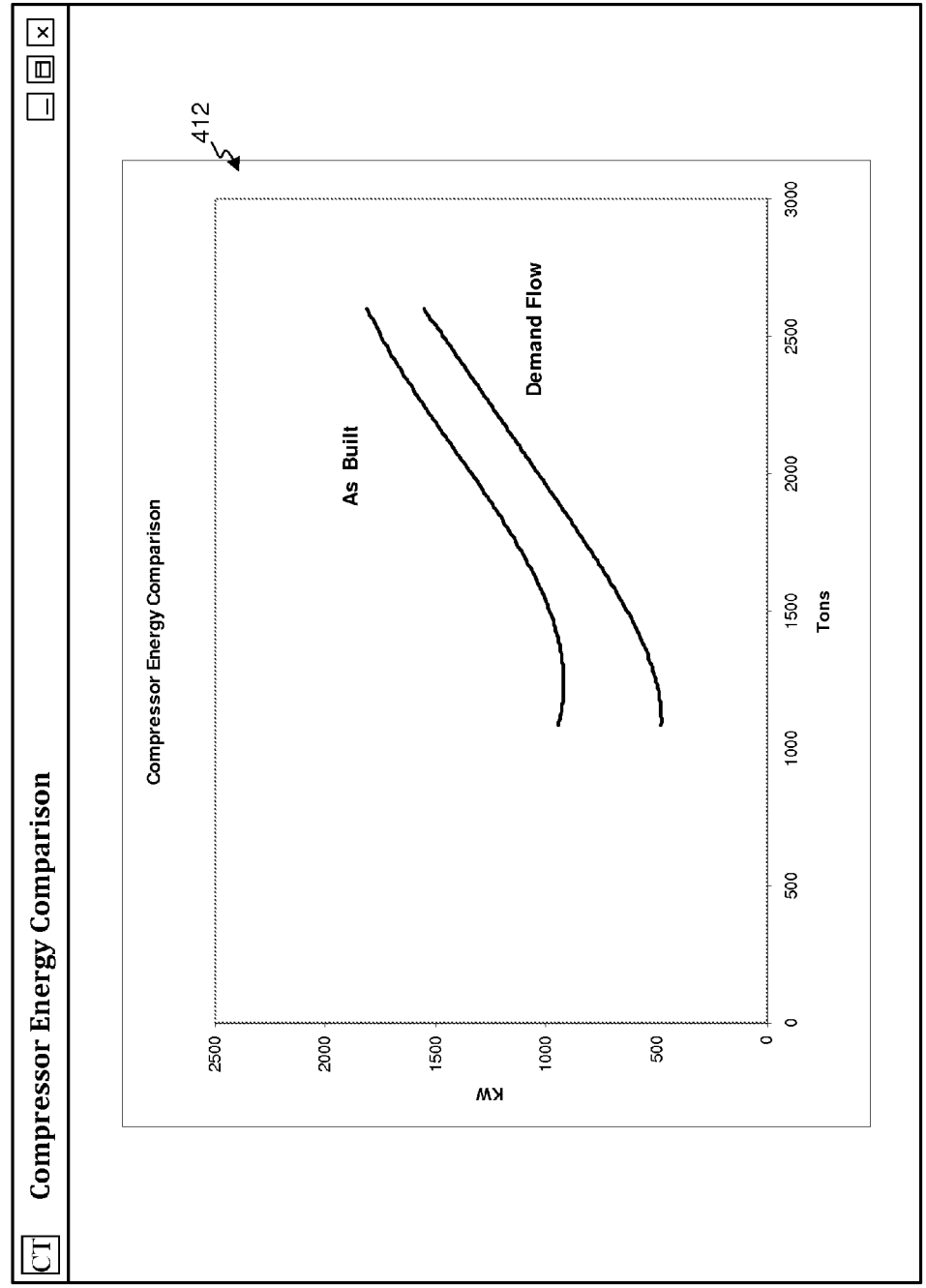
FIG. 4G illustrates an exemplary Compressor Energy Comparison.
Figure 4H:
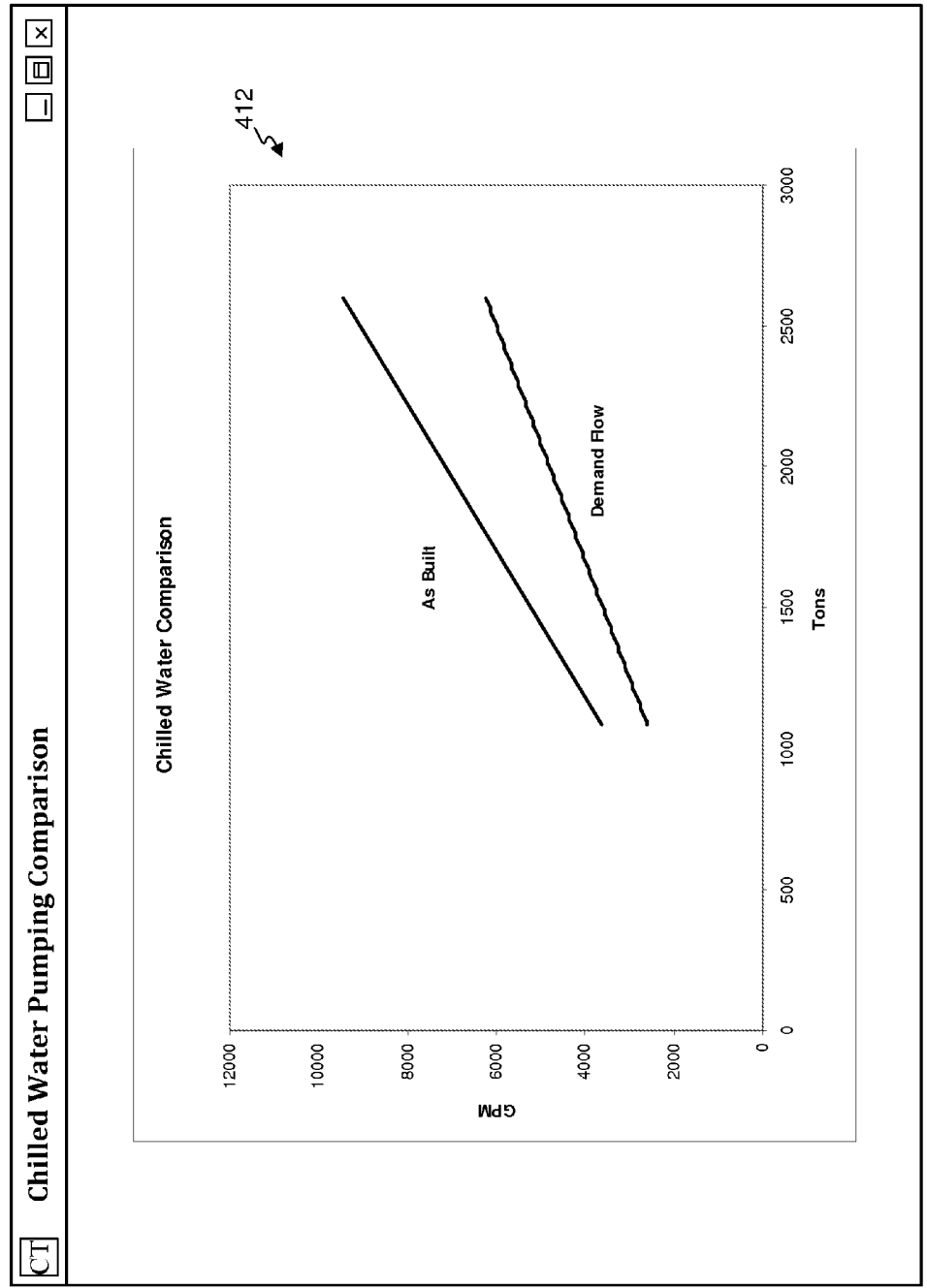
FIG. 4H illustrates an exemplary Chilled Water Pumping Comparison.
Figure 4I:
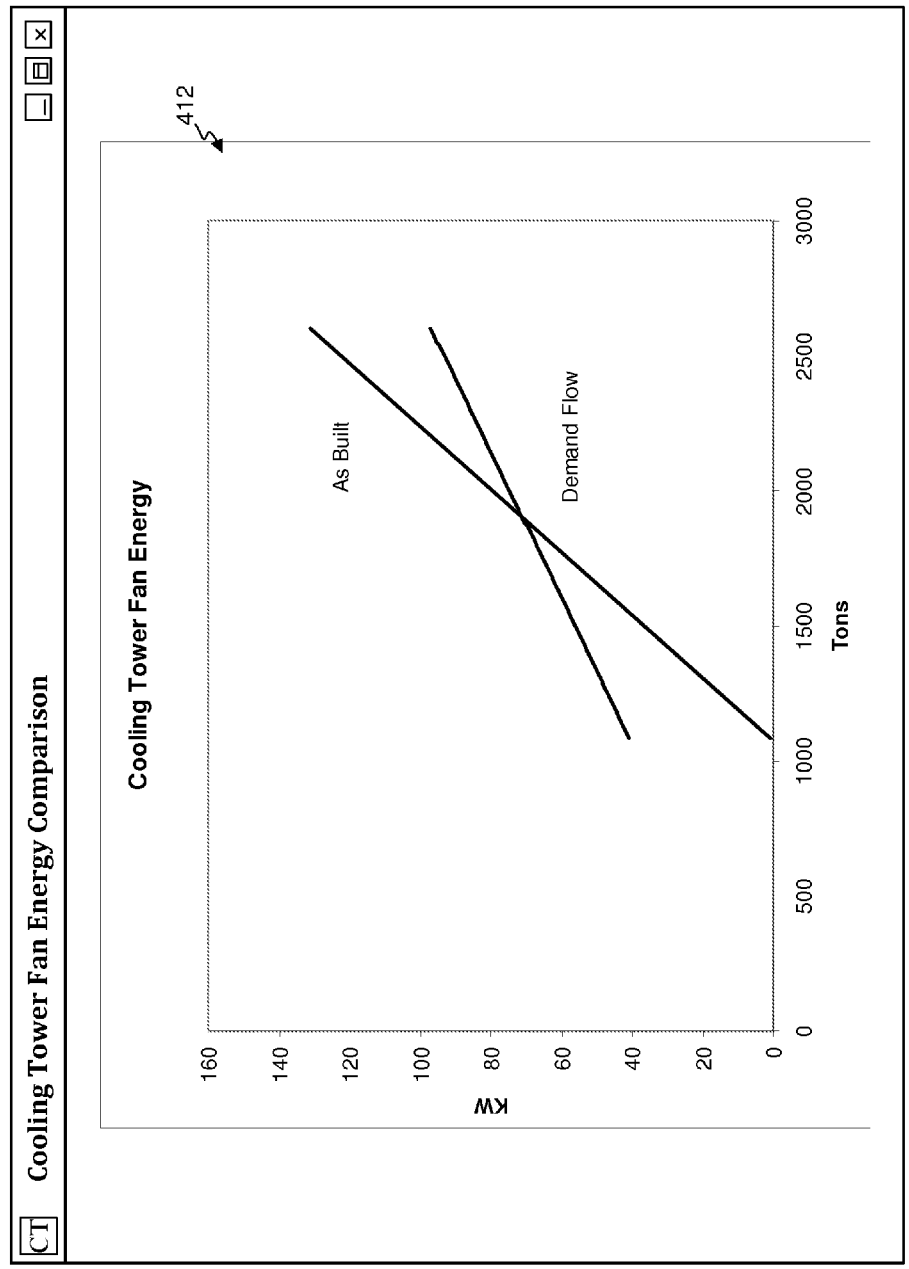
FIG. 4I illustrates an exemplary Cooling Tower Fan Energy Comparison.
Figure 4J:
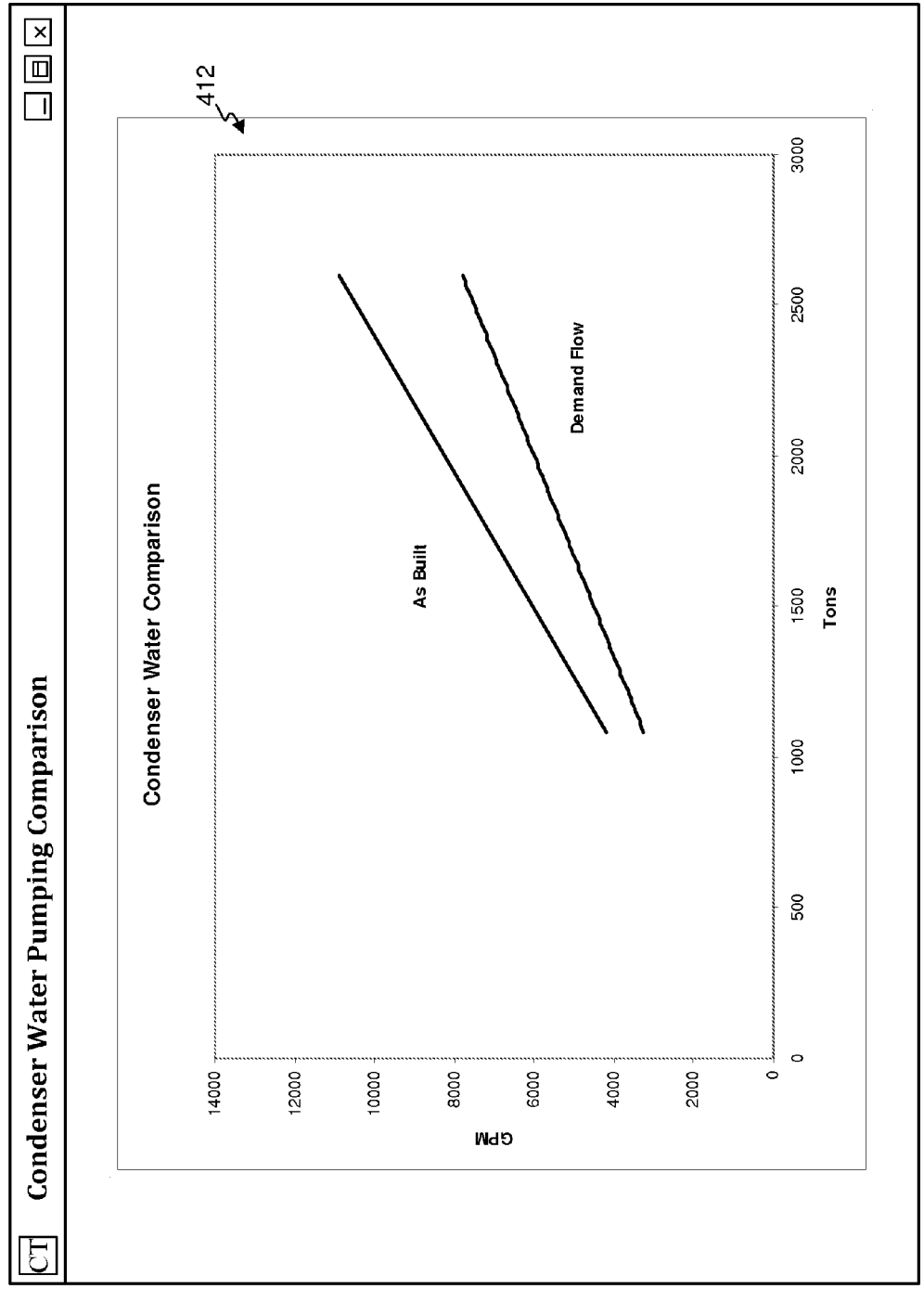
FIG. 4J illustrates an exemplary Condenser Water Pumping Comparison.
Figure 4K:
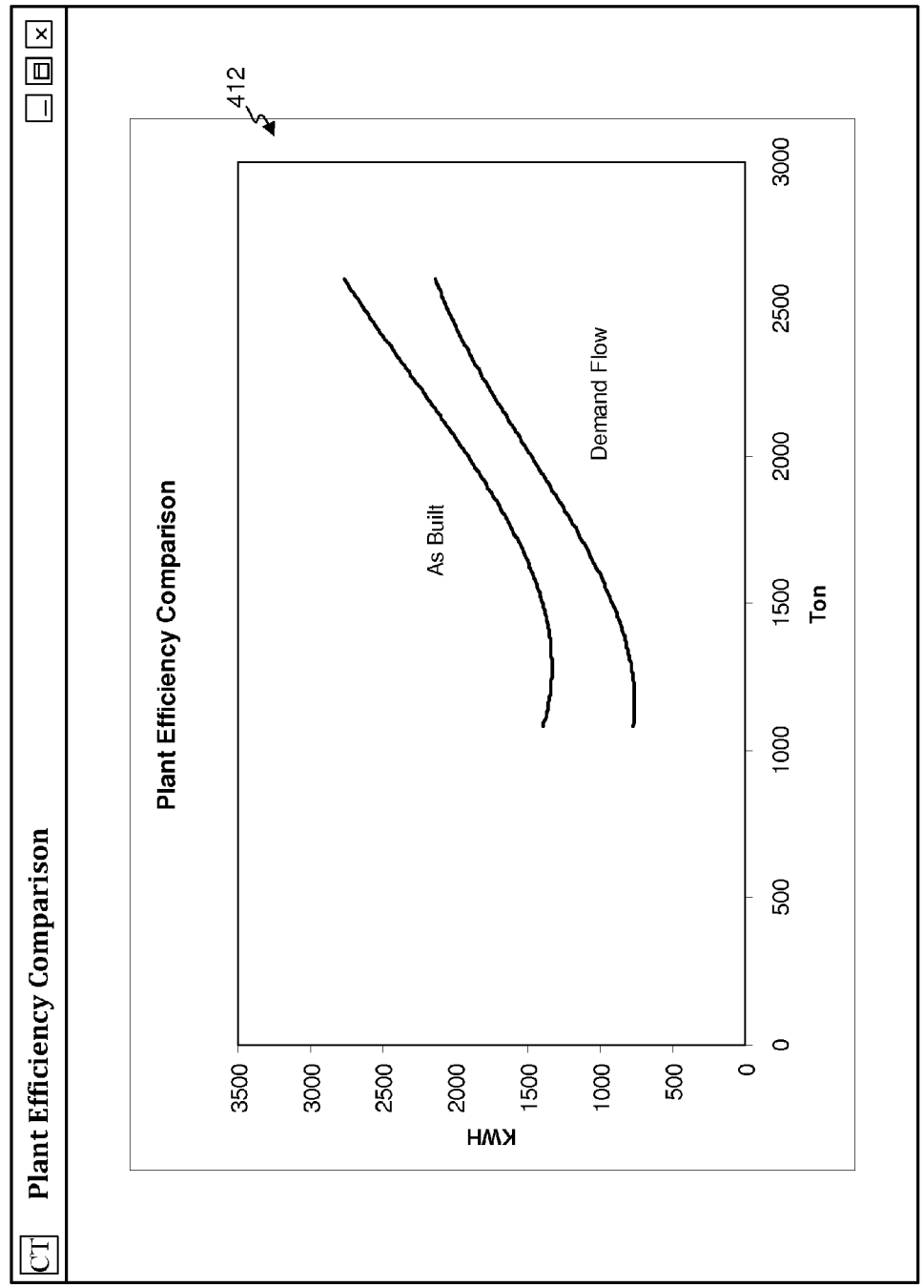
FIG. 4K illustrates an exemplary Plant Efficiency Comparison.

Once representative log data has been entered, an analysis of the data may be performed at a step 320. This may occur in various ways. For example, in one or more embodiments, one or more data processing units may collect monthly log data, graph the data, and/or determine design Demand Flow energy equations. The analysis may be done automatically, or the user may click an "Analyze Log Data" button 436, or the like, such as shown in FIG. 4F, to analyze the log and other data.

In one or more embodiments, the analysis may comprise calculating the energy utilization of a chilled water plant and/or various components of the chilled water plant as it is currently configured (or "As Built"). In one embodiment, the "As Built" chilled water plant sub-system energy may be calculated from empirical data, or plant logs, taken by plant operators. For example, all chilled water pump, condenser water pump, cooling tower fan and chiller compressor energy may be summed FIG. 4F illustrates an exemplary KW Profile where the current energy utilization (labeled "As Built KW") is shown in an output field 412 by plotting measured or calculated energy utilization at various time periods. A normal line or trend line may then be generated from these points, such as shown in the graph of FIG. 4F.

It is contemplated that current energy utilization of the chilled water plant may be determined directly from plant logs in some cases and thus calculation of a plant's current energy utilization need not be performed in all embodiments. For example, each month of a year may have up to 31 logs which comprise empirical plant operating data recorded by the engineers. Each log may yield the base line or current/as built KW used by the plant and the tonnage being developed. Each of these data points may be plotted onto a Cartesian plane, as illustrated by the square points in the graph of FIG. 4F. As stated, a normal line may be calculated from this data after all points from one or more of the months have been entered.

The analysis may also or alternatively comprise calculating an energy utilization of the chilled water plant and/or various components thereof operating in an idealized state (i.e., operating with one or more upgrades). In general, an idealized state is one where the plant is operating with increased efficiency. For example, an idealized state for a chilled water plant may be one where low delta T syndrome is reduced, controlled, or non-existent. An example of a chilled water plant operating in an idealized state where low delta T syndrome is reduced or eliminated can be found in this application's parent, U.S. patent application Ser. No. 12/507,806, directed to a system and method for demand flow chilled water pumping (Demand Flow) which is incorporated herein by reference. Generally speaking, operating a chilled water plant under Demand Flow principles produces an idealized state where plant efficiency is increased.

Energy utilization for a chilled water plant in an idealized state may be determined in various ways. For example, it may be assumed that chilled water plant components are operating under particular circumstances or the theoretical best circumstances to determine an ideal energy utilization. To illustrate, knowing the recorded wet bulb temperature, the current cooling tower fan energy, and the current entering condenser water temperature will allow the lowest achievable entering condenser water temperature and the resultant increase in cooling tower fan energy required to achieve it to be calculated or determined. Therefore, the reduction in current chiller energy utilization can be derived from the use of the colder condenser water effecting refrigerant sub-cooling in the chiller. In like manner, an idealized chilled water pumping GPM and the reductions in pumping energy may be calculated from the Affinity laws. The same rules may be applied to condenser water pumping where reductions in condenser water pumping energy may be calculated from the Affinity laws. The net increase and decreases in chilled water plant subsystem or component energy utilization may then be totaled and the resultant energy decrease potential can then be projected.

FIG. 4F illustrates trend lines showing energy utilization in KW for a chilled water plant currently (labeled "As Built KW"), under an idealized state (labeled "Demand Flow KW"), and under and idealized state with a replacement chiller (labeled "DF & Replacement Chiller KW"). The trend lines for the idealized states may respectively be generated by determining a normal line for one or more ideal or more efficient energy utilization points such as shown by the square and triangular points on the graph of FIG. 4F. These trend lines may then be used for further calculation of the effects of one or more plant upgrades.

For example, a normal line generated from the empirical log data (base line) equation (y=0.000000233832498x4−0.000615953879389x3+0.249381032817399x2−24.833418227775900x+1973.363813482700000) may be integrated with the normal line generated from the optimized or ideal line (Demand Flow Line) y=−0.000000167975595x4−0.000216245235662x3+0.117655069402073x2−8.983424281142090x+981.019934563207000 across the limits 0-31 days such that E=(Base Line Equation−Demand Flow Line Equation) dx. The application of that formula to January data yields: (((0.000000233832498*((0+I32)^5)/5−0.000615953879389*((0+I32)^4)/4+0.249381032817399*((0+I32)^3)/3−24.8334182277759*((0+I32)^2)/2+1973.3638134827*(0+I32))−(0.000000233832498*((0+H32)^5)/5−0.000615953879389*((0+H32)^4)/4+0.249381032817399*((0+H32)^3)/3−24.8334182277759*((0+H32)^2)/2+1973.3638134827*(0+H32)))*24*J32)−(((−0.000000167975595*((0+I32)^5)/5−0.000216245235662*((0+I32)^4)/4+0.117655069402073*((0+I32)^3)/3−8.98342428114209*((0+I32)^2)/2+981.019934563207*(0+I32))−(−0.000000167975595*((0+H32)^5)/5−0.000216245235662*((0+H32)^4)/4+0.117655069402073*((0+H32)^3)/3−8.98342428114209*((0+H32)^2)/2+981.019934563207*(0+H32)))*24*J32))) or 438,567 potential KW savings for the month of January as shown in FIG. 4F.

The same process may be used to derive the potential savings for the application of Demand Flow principals with a replacement chiller of increased efficiency. For example, the base line equation (y=0.000000233832498x4−0.000615953879389x3+0.249381032817399x2−24.833418227775900x+1973.363813482700000) is integrated with the Demand Flow/New Chiller Equation (y=−0.000000389308475x4+0.000005078880795x3+0.052828951313763x2−3.381050901758730x+746.109485558729000) across the same time limits of 0-31 days which yields the equation ((((0.000000233832498*((0+I32)^5)/5−0.000615953879389*((0+I32)^4)/4+0.249381032817399*((0+32)^3)/3−24.8334182277759*((0+I32)^2)/2+1973.3638134827*(0+I32))−(0.000000233832498*((0+H32)^5)/5−0.000615953879389*((0+H32)^4)/4+0.249381032817399*((0+H32)^3)/3−24.8334182277759*((0+H32)^2)/2+1973.3638134827*(0+H32)))*24*J32)−(((−0.000000389308475*((0+I32)^5)/5+0.000005078880795*((0+I32)^4)/4+0.052828951313763*((0+I32)^3)/3−3.38105090175873*((0+I32)^2)/2+746.109485558729*(0+I32))−(−0.000000389308475*((0+H32)^5)/5+0.000005078880795*((0+H32)^4)/4+0.052828951313763*((0+H32)^3)/3−3.38105090175873*((0+H32)^2)/2+

746.109485558729*(0+H32)))*24*J32) or 531,833 potential KW savings for the month of January.

In addition, an overall energy efficiency gain may be totaled and presented. For example, in one embodiment, reductions to energy utilization by chillers, condensers, air side fans, cooling towers, and other plant components achieved by operating plant pumps to reduce or eliminate low delta T may be determined and presented individually and as an overall combined energy savings. Operating chilled pumps at a higher delta T increases refrigerant superheat in the chiller, which in turn increases the refrigeration effect and chiller efficiency. This is shown by the equation, Compressor energy=Mass Flow*chiller refrigerant pressure differential between the evaporator and condenser. The Mass Flow, or weight of refrigerant that needs to be circulated at a given load is Weight=200/Refrigeration Effect*current tonnage. This example shows how, as the chilled water pumps are driven to a higher delta T, the refrigeration effect increases, reducing pump and compressor energy.

The results of an analysis may be viewed at a step 324. For example, the Annual Profile Data Sheet, such as illustrated in FIG. 4F, or other data sheet may present the results for viewing. In one or more embodiments, the Annual Profile Data Sheet may have associated data processing units to collect data from the logs, other data sheets, the like, or a combination thereof and present the results of an analysis. In FIG. 4F, the results of an analysis have been presented as an energy utilization graph via an output field 412.

As can be seen, this allows a user to determine the results of one or more plant upgrades or modifications, in terms of energy utilization. In the exemplary graph of FIG. 4F, implementation of plant upgrades provides a substantial reduction in energy usage. The top trend line shows energy utilization of the chilled water plant as currently configured while the bottom two trend lines show energy utilization after implementation of one or more plant upgrades.

It will be understood that the results may be presented in various forms other than graphs. For example, as shown in the figures, the results may be in the form of numerical data or other graphical representations. In addition, though the results will typically be presented in energy utilization, energy savings, or cost savings it is contemplated that the results may be presented in other ways. For example, for various plant components, results may be presented in output, work done, efficiency, or the like. In the case of chilled water or other pumps for instance, the results may be presented in GPM (Gallons Per Minute) or another output measurement. As another example, results for chillers may be presented in Tons or another output measurement.

The following are some examples of the variety of information that may result and be viewed after an analysis. For example, FIGS. 4G-4L illustrate exemplary comparison data sheets, namely, Compressor Energy Comparison, Chilled Water Pumping Comparison, Cooling Tower Fan Comparison, Condenser Water Pumping Comparison, Plant Efficiency Comparison, and Air Side Comparison (it is noted that the Air Side Comparison works off of the principal that, at a given load, fan speed can be reduced by supplying colder air to the space). Colder air can be produced by lowering the chilled water temperature to the coils. Operating under Demand Flow reduces de-coupler mix in the plants, which in turn lowers the supply chilled water temperature to the system. The air side work sheet computes the fan KW used to deliver the average load calculated by the qualification system. The lower air handler supply temperature may be selected by the user and the fan energy to deliver the same load. As can be seen, in one or more embodiments, these and similar comparisons will highlight the differences between the chilled water plant currently and the chilled water plant after one or more upgrades. This allows plant operators to quickly identify advantages (and disadvantages) to implementing the upgrades.

A summary of the results may also be provided. The Annual Comparisons Data Sheet of FIG. 4M illustrates one such summary. As can be seen, an annualized summary may contain data organized monthly (or by other periods of time). The variety of information resulting from an analysis can be seen in the table headings of FIG. 4M. The data may be organized for the chilled water plant in its non-upgraded state and for the chilled water plant after one or more upgrades. In FIG. 4M for example, the data has been grouped according to the chilled water plant "As Built" and the chilled water plant when running under one or more upgrades referred to as "Demand Flow."

The annualized summary may also provide an overall comparison for the year (or other period). For example, as shown at the bottom of FIG. 4M, base line or non-upgraded data for the chilled water plant is provided along with savings and energy utilization data for the chilled water plant after one or more Demand Flow upgrades for the entire year. The savings as a result of heat reclamation from inputted heat reclamation information (see FIG. 4C) may also be calculated and presented for the year. The summarized information is highly beneficial in that it reveals the overall benefit of one or more plant upgrades. In addition, the monthly listing of data allows plant operators to view their plant's operations monthly to identify high or low usage times. This may allow the operator to identify additional optimizations or upgrades.

In one or more embodiments, plant run time(s) may be adjusted if desired at a decision step 328. In general, adjustment of plant run time allows the user to specify the time a chilled water plant was running throughout a year (or other period). This improves the accuracy of the analysis because it allows the analysis to take into account any plant downtime. For example, in winter months a chilled water plant may have a reduced runtime or not run at all.

If runtime adjustments are desired, the user may make the adjustments at a step 332. For example, adjustments may be made using to the start day, end day, and/or percent run time of a chilled water plant during a month or other period of time. This adjustment may be accomplished via an Annual Profiles Page or the like, such as illustrated in FIG. 4F. As shown for example, Start Day, End Day, and Percent Run Time input fields 404 have been provided to allow for runtime adjustment.

The Start Day input fields may be associated with months (or other periods) and generally provide a location for the user to enter the first day of each month that the plant is in operation. In one embodiment for example, "1" is the default value and means that the plant began operation at the very start (i.e., first day) of the month. The input fields in the Start Day column, or their associated data processing units, may be configured to only accept numerical values from 1-31 in order to prevent invalid entries. The input fields of the End Day column may function similarly to those of the Start Day column, except that the user would enter the last day of the month (or other period) that the plant was in operation.

The runtime may be further specified in various ways. For example, Percent Run Time input fields 404 may be provided to allow the user to specify the percentage of time that the plant was in operation for each month (or other period). Like the Start Day and End Day input fields, each month may have a corresponding input field in this column. For example, if a plant was in operation for 12 hours per day, the user would enter 50% in this field. The input fields in this column, or their associated data processing units, may be configured to only accept values from 0 to 100.

The following examples are provided to aid in understanding the Start Day, End Day and Percent Run Time columns:

1. A plant operates 24 hours per day, 365 days per year: 0 would be entered as the Start Day for every month, and the last day of each month would be entered as End Day and Percent Run Time would be 100% for all months.
2. A plant operates 12 hours per day, every month except January and February. For January, the plant doesn't operate and for February, the plant operates 24 hours per day: Percent Run time would be adjusted to 50% for each month except January and February. January Percent Run Time should be 0% (or adjust start and end day to 0) and February Percent Run time would be 100%
3. A plant operates all year except for February 10th to March 15th: End Day for February should be set to 9 and Start Day for March would be set to 16.

As can be seen, the qualification system provides the benefit of allowing a user to quickly enter data to identify the runtime of a plant. To illustrate, only three values, Start Day, End Day, and Percent Run Time, need be entered to represent the runtime for an entire month. Only the Start Day and End Day, or only the Percent Run Time may be entered in some embodiments. In this manner, the user need not add up or calculate the runtime. In addition, it is contemplated that in some embodiments, the user may enter a single value representing the runtime for the month. For example, the user may enter the number of hours of runtime or an estimate thereof.

After any desired the adjustments have been made, another analysis (utilizing the adjusted runtime) may be performed at the step 320. For example, the user may press the "Analyze Log Data" button or the like to perform a new analysis. The results of this analysis may then be viewed at step 324, as described above.

If at the decision step 328, no runtime adjustments are desired, the results of the analysis may be used at a step 336. It will be understood that the use of the results may simply be viewing the results in some embodiments. In general however, the user, a plant operator, or other personnel may utilize the analysis results to decide whether or not to implement one or more plant upgrades. Because the qualification system provides the analysis results quickly (and thus inexpensively), the plant operator may have one or more analysis performed in making his or her decision. Moreover, the user of the representative log data helps ensure that the analysis is accurate. In addition, it is contemplated that, if the plant operator is interested in one or more upgrades, additional analysis of higher accuracy may be performed, such as by inputting additional representative log data (or even all the log data). This may confirm the accuracy of a previous "quick" analysis, be used to better inform a plant operator's decision, or both.

Additional details regarding the calculations and other operations involved in performing an analysis of a chilled water plant will now be described. As stated above, it will be understood that though presented in a particular programming language, the operations may be implemented in various programming languages and/or hardwired in various processors, controllers, or the like. It will be understood that in one or more embodiments, the operations may be compiled or otherwise processed into binary data prior to execution.

The following code has been separated into functions. In one or more embodiments, each function may form a data processing unit. It will be understood however, that a plurality of functions may form a data processing unit as well. As will be seen, the functions/data processing units below may be associated with various input units, output units, or both. In addition, as will be seen, the functions/data processing units may be associated with one or more data sheets.

One or more data processing units may be used to setup a data sheet, to update various headings or titles or both. For example, referring to the exemplary Design Data Sheet of FIG. 4B, the following code may be executed when any change is made on the design sheet to update page heading information when the plant name and date are changed.

```
Private Sub Worksheet_Change(ByVal Target As Range)
    Dim KeyCells As Range
/* Only update the header if the cell that was changed is either the plant
name or date cell. */
    Set KeyCells = Range("DesignName,DesignDate")
    If Not Application.Intersect(KeyCells, Range(Target.Address)) _
    Is Nothing Then
/* Update the left and right header of each sheet with the newly entered
values. */
        Dim LoopCount As Integer
        For LoopCount = 1 To Application.Sheets.Count( )
            If TargetAddress = "$B$2" Then
            Application.Sheets(LoopCount).PageSetup.LeftHeader =
            Range("DesignName").Value
                If Target.Address = "$P$2" Then
            Application.Sheets(LoopCount).PageSetup.RightHeader =
            Range("DesignDate").Value
            Next
        End If
End Sub
```

One or more input units may be prepared as well. For instance, the State combo box may be filled with the 50 states as part of the data sheet initialization or setup process. A data processing unit may be associated with the combo box to perform one or more operations in response to the state value being changed. The following function illustrates exemplary operations that may be performed in response to the state being changed. It is noted that a data processing unit may also or alternatively save or store data so that the user's input may be preserved for subsequent usage.

```
Private Sub StateComboBox_Change( )
/* The selected state has changed, so clear both the items and the current
value of the City combo box. */
    CityComboBox.Clear
    CityComboBox.Value = ""
/* Initialize variable and loop through each row on the wet bulb data sheet.
If the current row's state column matches the state selected in
StateComboBox, add the city to CityComboBox. */
    Dim CityRow As Integer
    For CityRow = 5 To 757
        If Application.Sheets("Wet Bulb Data").Range("A" &
        CityRow).Value = StateComboBox.Value Then
            CityComboBox.AddItem (Application.Sheets("WB
        Data").Range("B" & CityRow).Value)
        End If
    Next
/* Store the current value of the state combo box in storage cell B1 for use
when the file is closed and re-opened. */
    Sheets("Design").Range("B1").Value = StateComboBox.Value
End Sub
```

As discussed above, changes to the city of the chilled water plant may trigger one or more operations. As discussed above, wet bulb information may be automatically provided for a selected city, upon selection of the city. Other operations are also possible. For example, the user's selected city may be saved as can be seen from the following.

```
Private Sub CityComboBox_Change( )
/* Set the value of cell E1 to the current value of the city combo box, for
later retrieval on file open. */
    Sheets("Design").Range("E1").Value = CityComboBox.Value
End Sub
```

As another example, the Replacement Chiller section may be filled with default or initial values by one or more data processing units. For example, values from one of the chillers (e.g. Chiller 1) in the Chillers section may be used to fill in corresponding values for a new chiller in the Replacement Chiller section. The user may subsequently change these values to correspond with values for a proposed replacement chiller.

As stated above, data processing units may also perform one or more operations to calculate various values related to a chilled water plant's operation. The following provides various exemplary calculations that may be performed. These examples have been provided with reference to the fields of the Design Data Sheet of FIG. 4B, though it will be understood that the operations/calculations may be associated with various data sheets. It will also be understood that though described as utilizing data from particular fields, the data processing units may utilize the data from a variety of fields during execution.

For example, to calculate CH KW (Chiller Kilowatts), values or data from the Chiller Voltage, CH RLA (Chiller RLA), and/or CH PF (Chiller Power Factor) fields. In one embodiment, the formula CH KW*1.73*CH RLA*CH PF/1000, where 1.73 and 1000 are constants, may be utilized by a data processing unit to calculate Chiller Kilowatts.

CH KW/TON (Chiller Kilowatts per Ton) of a chiller may be calculated using the calculated Chiller KW and a user-supplied CH Tons (Chiller Tons). For example, Chiller KW may be divided by CH Tons to determine CH KW/Ton. There may be an initial check to verify that the division does not result in an error. For example, if Chiller Kilowatts is greater than zero and dividing this value by the CH Tons does not result in an error, CH KW/TON may be calculated. Otherwise, no action may be performed and/or the CH KW/TON field for a chiller may be blank. As can be seen, data processing units may first check if a calculation may result in an error prior to continuing with one or more operations. This check may be specific or may be a broad check, such as to check for an exception upon executing an operation. If an error results or is detected, it is contemplated that the output may be set to a zero or null value, or blank.

PP LOAD FACTOR (Primary Pump Load Factor) may be calculated with data from the PP GPM (Primary Pump Gallons per Minute), PP TDH (Primary Pump Total Design Head), and/or PP HP (Primary Pump Horsepower) fields. For example, the formula PP GPM*PPTDH*3960/PP HP, where 3960 is a constant, may be used to calculate PP LOAD FACTOR. The PP LOAD FACTOR may be limited in one or more embodiments. For example, if the calculated PP LOAD FACTOR is less than 0.9, the PP LOAD FACTOR field may be configured to contain the calculated value. If the field is equal to or greater that 0.9, the field may be set to a default 0.9. It is noted that though 0.9 is a typical default value, other default values may be used. It is also noted that various constants may be used herein, and that the results of calculations herein may be limited to various values.

CWP LOAD FACTOR (Condenser Water Pump Load Factor) may be calculated by using data from CWP GPM (condenser water pump gallons per minute) CWP TDH (condenser pump total design head), and/or CWP HP (condenser water pump horsepower) values. For example, the formula CWP GPM*CWP TDH*3960/CWP HP, where 3960 is a constant, may be used to calculate CWP LOAD FACTOR. In one or more embodiments, if the calculation results in a value less than 0.9, the CWP LOAD FACTOR field may be set to the calculated value. Otherwise, the field may be set to 0.9 to limit the CWP LOAD FACTOR to a maximum of 0.9.

Data processing units may also be used to validate selections of values presented to the user. For example, when the user selects a state, only cities in that state are presented in the City combo box. Likewise, the Refrigerant and Calculation Method field for the chillers may be validated to ensure only a valid refrigerant type may be selected for a particular chiller such as may be indicated by manufacturer data tag on the side of the chiller or other manufacturer information identifying the refrigerant type(s) being compatible with the chiller.

MM CHW Flow (Minimum Chilled Water Pump Flow) may be calculated using PP GPM and the minimum flow from design GPM that will be allowed in all calculations. It is noted that 0.7 is a typical minimum flow rate for chillers and is used as a default if the exact specifications are not known at the time the CT was completed. In FIG. 4B, the minimum flow value is 0.8 as can be seen in the last row of the fields below the MM CHW Flow label. The formula PP GPM*Minimum Flow Value may be used to determine Min CHW Flow for a chiller. MM CW Flow (Minimum Condenser Water Pump Flow) may be calculated using the provided CWP GPM and the minimum flow value (such as previously described). In FIG. 4B, the minimum flow value for the MM CW Flow calculation is 0.8 as can be seen from the last row of the fields below the MM CW Flow label. The formula CWP GPM*Minimum Flow Value may be used to determine MM CW Flow for a chiller.

Totals for CH Tons, CH RLA, CH KW, PP HP, PP GPM, CWP HP, CWP GPM may be calculated by summing these values for each chiller. For example, Total CH Tons may be calculated in the example of FIG. 4B by summing the CH Tons values for Chillers 1-4. In one or more embodiments, if the sum of the field values is greater than 0 the sum may be presented in a total or sum field, otherwise the field may be blank.

Averages may also be calculated for values in various output and input fields. For example, as shown, averages for CH KW/TON, EVAP SUPPLY (Evaporator Supply Temperature), EVAP RETURN (Evaporator Return Temperature), COND SUPPLY (Condenser Supply Temperature), and/or COND RETURN (Condenser Return Temperature) may be calculated.

Other calculations may be performed on the chiller data as well. For example, a line of best fit for a CH KW/TON profile may be calculated using the chiller data in the CH KW and CH Tons fields. Various values resulting from this calculation may be presented. For example, though not shown, the first value from the array containing the line-equation may be presented, such as via an output field. Alternatively or in addition, the second and/or third value from the array that describes the equation of the line of best fit may be presented. As will be described further below, these values may be used in conjunction with chiller production tons data, such as found on the Log Data sheets, for further calculations. Of course, additional values from the array may be presented and used as well.

SP LOAD FACTOR (Secondary Pump Load Factor) may be calculated with a similar or the same formula used in PP LOAD FACTOR and CWP LOAD FACTOR calculations, but substituting in the SP GPM (Secondary Pump GPM), SP TDH (Secondary Pump TDH), and SP HP (Secondary Pump HP) for the corresponding primary pump/condenser water pump values. For example, the formula SP GPM*SP TDH*3960/SP HP, where 3960 is a constant, may be used to calculate SP LOAD FACTOR. The calculated value may be limited as well, such as to a maximum value of 0.9. To illustrate, the SP LOAD FACTOR field may be set to 0.9, if the calculated value is greater than 0.9.

Cooling Tower Tons, such as shown in the Cooling Tower section, may be calculated by using CH Tons and multiplying by a constant, such as 1.25.

The Chiller Efficiency section may be prepared by filling in the chiller names, such as provided by the user in the Chillers section. For example, the chiller names entered in the Chillers section may be duplicated for the Chiller Efficiency section, such as shown in FIG. 4B. EVAP DELTA (Evaporator Delta) may be calculated with values for EVAP SUPPLY (Evaporator Supply Temperature) and EVAP RETURN (Evaporator Return Temperature) for each chiller. For example, EVAP DELTA may be calculated with the formula EVAP RETURN−EVAP SUPPLY. If the result is not greater than zero, the EVAP DELTA field may be left blank.

EVAP GPM/TON (Evaporator GPM per TON) may be calculated with values for PP GPM and CH Tons. For example, the formula PP GPM/CH Tons may be used to calculate EVAP GPM/TON. If this division results in an error, the EVAP GPM/TON field may be blank.

COND DELTA (Condenser Delta) may be calculated with the COND RETURN (Condenser Return Temperature) and COND SUPPLY (Condenser Supply Temperature) values for a chiller. For example COND DELTA may be calculated by the formula COND RETURN−COND SUPPLY. Again, if the result is not greater than zero the COND DELTA field may be left blank.

COND GPM/TON (Condenser GPM per Ton) may be calculated with values from CWP GPM and CH Tons. For example, the formula CWP/CH Tons may be used to calculate COND GPM/TON. If this division results in an error, the COND GPM/TON field for the chiller may be left blank.

Average Wet Bulb and Cooling Tower Approach may be calculated as well, such as shown in the Wet Bulb Data section. Average Wet Bulb for monthly or other periods may be calculated based on the user-supplied input in the city and state drop down boxes and corresponding fields. For example, the qualification system may have a list, database, or other record of preset wet bulb information for selected cities/states. In one embodiment, this information may include dry bulb information (DB), mean coincident dry bulb temperatures (MCDB), wet bulb information (WB), mean coincident wet bulb temperatures (MCWB), and mean daily temperature range (MDT) for monthly and other periods on a per location basis (e.g., per city or per state). The value of an Average Wet Bulb field may then be calculated and set by the formula (MCWB−MDT)/2, unless this calculation causes an error.

Cooling Tower Approach may be determined according to CT APP (Cooling Tower Approach) data, such as collected via or found on the Annualized Data sheet. Though not required, it is noted that in the case of July and August this value is preferably be set by the user according to the chilled water plant's location because of the wide variation for this data in various locations.

If the CT APP value is less than the predetermined constant for the month (e.g., 2 in this case) then the CT APP value may be rounded and used in the Cooling Tower Approach field for a month (or other period). IF the value is not less than the constant the predetermined constant may be put into the Cooling Tower Approach field for the month.

Totals for SP HP and SP GPM may be calculated by summing these values for each secondary pump. Likewise, totals for CT Tons may be calculated by summing CT Tons values. If these sums are greater than zero the corresponding SP Total HP, SP Total GPM, CT Total Tons fields may be set to their corresponding sum. Otherwise these fields may be left blank.

Averages for EVAP DELTA, EVAP GPM/TON, COND DELTA, COND GPM/TON may be calculated by summing corresponding values for each chiller and dividing by the number of values. If no error results, the calculated average may be outputted in the corresponding Average field, such as shown in the Chiller Efficiency section.

Dollar per KWH, as shown in the Energy Costs section may be calculated by dividing a Gas Costs/Decatherm (Gas Costs per Decatherm) value by an Annual Total KWH value. If these fields are empty, and thus Dollar per KWH cannot be determined, the user may enter or be required to enter a value for Dollar per KWH.

Air Side CFM may be calculated by multiplying a Maximum PLV Tons value (i.e., the largest PLV Tons value occurring over a period of time, such as an annual period as shown on the Annualized Data sheet) with a constant. For example, the formula Max PLV Tons*400, where 400 is a constant, may be used to calculate Air Side CFM, such as shown in the Air Side Data section.

Calculations relating to the Reclaim Calculation Data Sheet will now be described with reference to FIG. 4C. The Base Plant Load may be retrieved from another source or provided by the user. For example, Base Plant Load may be set to the monthly (or other period) PLV Tons value from the Annualized Data Sheet. Decatherms per Month may then be calculated with the formula Base Plant Load*12000*Hours/1000000*% Reclaim, where 12000 and 1000000 are constants and Hours are the number of hours that the chiller is in operation (which is the number of hours at which heat may be reclaimed). As stated above, the % Reclaim value may be provided by the user.

The Natural Gas Offset $ may be calculated by multiplying gas costs with Decatherms per Month. The gas costs value may be obtained from the user or elsewhere. For example, the Gas Costs per Decatherm value from the Design Data Sheet may be used. Totals of the Hours, Decatherms per Month and Natural Gas Offset $ may also be summed and presented in corresponding fields, such as shown in FIG. 4C.

Referring now to the Empirical Data Sheet of FIG. 4D, total chiller energy may be calculated by summing the chiller KW values for each chiller for a period of time. As shown for example, the values may be summed on a daily basis. If the sum of chiller KW is not equal to zero, take the sum as the value for the Total field, otherwise the field may be left blank. Likewise, the monthly average may be calculated and presented in the Month Average field for each day or other period of time.

Calculations and operations of the Monthly Log Data Sheets will now be described. It is noted that Monthly Log Data Sheets will typically all use the same calculations or operations as will be described in the following.

Referring to FIGS. 4E-1 and 4E-2, and Add Log button, or the like, may be provided. As described above, the Add Log button may be used to initiate a process by which a log entry may be inputted into the qualification system. The following illustrates exemplary operations which may be executed to add a log.

```
Sub NewLog( )
    Dim LastRow As Long
    Dim DestRange As String
    Dim SelRange As String
```

-continued

```
/* Determine the last row in the sheet that contains data. */
    LastRow = Cells.Range("A:J").Find(What:="*", After:=[A1],
SearchOrder:=xlByRows, SearchDirection:=xlPrevious).Row
/* Set the destination range to the first cell after the last row that contains
data, and the selection range to the second column in that row. */
    DestRange = "A" & LastRow + 1
    SelRange = "B" & LastRow + 1
/* Copy the entire log template sheet to the destination range assigned
above. LogTemplateRows is a global constant that should be adjusted if
the number of rows in the log template is changed. */
    Sheets("Log Template").Range("A2:J" & (1 +
LogTemplateRows)).Copy Destination:=ActiveSheet.Range(DestRange)
/* Select the date cell (B2) of the log template that was just pasted. This is
to allow immediate entry of the log date. */
    Range(SelRange).Select
/* Call the procedures to update the log count and summary as explained
in the next sub-section. */
    UpdateLogCount
    UpdateSummary
End Sub
```

The following procedure may be called by above the NewLog procedure, to which is invoked by clicking the Add Log button.

```
Sub UpdateLogCount( )
    Dim LastRow As Long
/* Determine the last row in the sheet that contains data. */
    LastRow       =       Cells.Range("A:J").Find(What:="*",
    After:[A1],
SearchOrder:=xlByRows, SearchDirection:=xlPrevious).Row
/* Calculate the number of logs on the sheet using the number of rows
and the number of rows in a template. Insert this result into a "Log:"
field G1 indicating the number of logs on the sheet. */
    Range("G1").Formula = (LastRow − 1) / LogTemplateRows
End Sub
```

The following exemplary operations may be used to remove a log, such as when a Remove Log button, or the like is activated.

```
Sub RemoveLog( )
    Dim LogNumberStr As String
    Dim YesNo As Integer
    Dim LogNumberInt As Integer
    Dim LogCount As Integer
    Dim IsSelection As Integer
    IsSelection = 0
/* Call procedure to populate list box on FrmLogSelect with an entry for each log,
such as explained in next sub-section. */
    EnumLogs
/* This function was invoked by the Remove Log button, so prepare FrmLogSelect to
be used for log removal, rather than log selection (discussed later). */
    FrmLogSelect.Caption = "Remove Logs"
    FrmLogSelect.Label1.Caption = "Select the logs you wish to remove."
    FrmLogSelect.CmdRemoveAll.Visible = True
    FrmLogSelect.ListBoxLogs.ListStyle = fmListStyleOption
    FrmLogSelect.ListBoxLogs.MultiSelect = fmMultiSelectMulti
/* Preparation is complete, so show the form to the user. */
    FrmLogSelect. Show
    Dim lItem As Long
/* Form has been closed, so scan each item in the list to determine if the user selected
at least one log for removal. */
    For lItem = 0 To FrmLogSelect.ListBoxLogs.ListCount − 1
        If FrmLogSelect.ListBoxLogs.Selected(lItem) = True Then
            IsSelection = 1
        End If
    Next
/* There is at least one log selected for removal. */
    If IsSelection = 1 Then
/* Display a message box asking the user to confirm that they would like to remove
the logs they selected. */
        YesNo = MsgBox(Prompt:="Are you sure you would like to remove
        selected logs?" & vbNewLine & "All data in the logs will be deleted.",
        Buttons:=vbYesNo, Title:="Remove Logs?")
/* The user confirmed log removal, proceeed. */
        If YesNo = vbYes Then
            lItem = FrmLogSelect.ListBoxLogs.ListCount − 1
/* Check each item in the list box starting at the end to determine if the user selected it
for removal or not. */
            Do While lItem >= 0
/* Current item is selected. */
                If FrmLogSelect.ListBoxLogs.Selected(lItem) = True Then
                    Dim DelRange As String
/*Set the initial cell in the deletion range by using the number of log template rows
and the item number in the list box. */
                    DelRange = "A" & 2 + LogTemplateRows * lItem
/* Set the final cell in the deletion range. */
                    DelRange   =   DelRange   &   ":J"   &   2   +
(LogTemplateRows * (lItem + 1)) − 1
/* Perform deletion of the range set above. */
                    Range(DelRange).Delete (xlShiftUp)
/* Item has been deleted from the logs sheet, so clear its selected status in the list box.
*/
```

```
                FrmLogSelect.ListBoxLogs.Selected(lItem) = False
            End If
            lItem = lItem − 1
        Loop
    End If
End If
/* Call the procedures to update log count and summary cell formulas (explained
previously). */
    UpdateLogCount
    UpdateSummary
End Sub
```

The following procedure may be called from the RemoveLog procedure such as to populate the list box on FrmLogSelect.

```
Sub EnumLogs( )
    Dim TempStr As String
/* Determine the last row in the sheet that contains data. */
    LastRow    =    Cells.Range("A:J").Find(What:="*",
After:=[A1],
SearchOrder:=xlByRows, SearchDirection:=xlPrevious).Row
/* Determine number of logs on the sheet. */
    TotalLogs = (LastRow − 1) / LogTemplateRows
/* Clear any items that might currently be in the list
box of FrmLogSelect in preparation for inserting the current list
of items. */
    FrmLogSelect.ListBoxLogs.Clear
    For LogCount = 1 To TotalLogs
/* Add log number to list box item for current log. */
        FrmLogSelect.ListBoxLogs.AddItem Range("J"
& 2 + ((LogCount − 1)
* LogTemplateRows)).Text
/* Add date to list box item for current log. */
        FrmLogSelect.ListBoxLogs.List(LogCount − 1, 1) =
Range("B" & 2 + ((LogCount − 1) * LogTemplateRows)).Text
/* Add as built plant KW to list box item of current log, removing the
decimal and anything after it, if applicable. */
        TempStr = Range("B" & 101 + ((LogCount − 1) *
LogTemplateRows)).Text
        If InStr(TempStr, ".") Then
            TempStr = Left(TempStr, InStr(TempStr, ".") − 1)
        End If
        FrmLogSelect.ListBoxLogs.List(LogCount − 1, 2) = TempStr
/* Add demand flow plant KW to list box item of current log, removing
the decimal and anything after it, if applicable. */
        TempStr = Range("B" & 110 + ((LogCount − 1) *
LogTemplateRows)).Text
        If InStr(TempStr, ".") Then
            TempStr = Left(TempStr, InStr(TempStr, ".") − 1)
        End If
        FrmLogSelect.ListBoxLogs.List(LogCount − 1, 3) = TempStr
    Next
End Sub
```

It is contemplated that a user may be permitted to "jump" to a particular log in one or more embodiments. The following illustrate exemplary operations that may be performed as a result of activating a Goto Log button, or the like, to access or present a particular log as may be selected by the user.

```
Sub GotoLog( )
    Dim LogNumberStr As String
    Dim LogNumberInt As Integer
    Dim LogCount As Integer
/*Call procedure to populate list box on FrmLogSelect with an entry for
each log, as described above. */
    EnumLogs
```

```
/* This function was invoked by the Goto Log button, so prepare
FrmLogSelect to be used for single log selection, rather than log
removal. */
    FrmLogSelect.Caption = "Go To Log"
    FrmLogSelect.Label1.Caption = "Double-click the log you wish
to select."
    FrmLogSelect.CmdRemoveAll.Visible = False
    FrmLogSelect.ListBoxLogs.ListStyle = fmListStylePlain
/* Only allow selection of a single log. */
    FrmLogSelect.ListBoxLogs.MultiSelect = fmMultiSelectSingle
/* Form is prepared; show it to the user. */
    FrmLogSelect.Show
/* If the user double-clicked a log, select the date cell of that log.
Otherwise skip this section and do nothing. */
    If FrmLogSelect.ListBoxLogs.Value <> "" Then
        Dim SelRange As String
        SelRange = "B" & 2 + (FrmLogSelect.ListBoxLogs.Value *
LogTemplateRows)
        Range(SelRange).Select
    End If
End Sub
```

Use the sheet name as the title of the log sheet:
/* Find the sheet name in the file name using formatting information. */=MID(CELL("filename",A1),FIND("]", CELL("filename",A1))+1,255)

Users may also be permitted to view or access Monthly Log Data Sheets sequentially. For example, Previous and/or Next buttons, or the like may be provided to move from one data sheet to the previous or next data sheet. The following illustrates exemplary operations which may be performed to accomplish this. For example, a Previous button may call the following function.

```
Sub Prev_Click( )
/* Activate the previous sheet (according to their arrangement at the
bottom of the Excel window) if there is one, otherwise activate
sheet 1. */
    If         ActiveSheet.Index          <>
ActiveWorkbook.Sheets(ActiveWorkbook.Sheets.Count).Index Then
        ActiveSheet.Previous.Activate
    Else
        ActiveWorkbook.Sheets(1).Activate
    End If
End Sub
```

As another example, a Next button, or the like may call the following function.

```
Sub Next_Click( )
/* Activate the next sheet (according to their arrangement at the bottom of
the Excel window) if there is one, otherwise activate sheet 1. */
    If         ActiveSheet.Index          <>
ActiveWorkbook.Sheets(ActiveWorkbook.Sheets.Count).Index Then
        ActiveSheet.Next.Activate
```

```
Else
    ActiveWorkbook.Sheets(1).Activate
End If
End Sub
```

Referring now to the Annual Profile Data Sheet, as illustrated in FIG. 4F, one or more calculations or operations may be performed to retrieve log and other data and to perform one or more analysis on the data for output to the user. As can be seen, the output may be presented as trend lines on a graph or numerical values in one or more embodiments. An "Analyze Log Data" button 436, or the like, may be provided to initiate an analysis.

In one or more embodiments, data may be retrieved from one or more logs prior. The following illustrates exemplary code for data retrieval which may be executed as a result of activating the Analyze Log Data button or the like.

```
Sub RetrieveData( )
    Dim MonthCount As Integer
    Dim LogMonths(0 To 11) As String
    Dim MonthlyLogCount As Integer
    Dim MonthlyTotalLogs As Integer
    Dim CurrentRow As Integer
    Dim TotalLogs As Integer
    Dim LastRow As Long
/* Set total logs to 0, to remove any number that might be present from a previous
run. */
    TotalLogs = 0
/* Setup array with month names that correspond to log sheet names.
Logs sheets must be named correctly for this procedure to work properly. */
    LogMonths(0) = "January"
    LogMonths(1) = "February"
    LogMonths(2) = "March"
    LogMonths(3) = "April"
    LogMonths(4) = "May"
    LogMonths(5) = "June"
    LogMonths(6) = "July"
    LogMonths(7) = "August"
    LogMonths(8) = "September"
    LogMonths(9) = "October"
    LogMonths(10) = "November"
    LogMonths(11) = "December"
/* Temporarily disable automatic calculation to improve speed of data insertion
process and unprotect the Annual Profile sheet incase it is protected. */
    Application.Calculation = xlCalculationManual
    Application.Sheets("Annual Profile").Unprotect ""
/* Find the last row of any existing collected log data and then use this information to
delete and collected data that may be on the Annual Profile sheet from a previous run
of this procedure. */
    LastRow    =    Cells.Range("A:E").Find(What:="*",    After:=[A1],
SearchOrder:=xlByRows, SearchDirection:=xlPrevious).Row
    If LastRow < 32 Then LastRow = 32
        Range("A32:E" & LastRow).Delete (xlShiftUp)
/* Loop through each log sheet individually and collect the data for each log on each
sheet. */
    For MonthCount = 0 To 11
/* Calculate the number of logs on the current sheet by finding the last row with data
in it and dividing the total number of rows by the number of rows in each template. */
        MonthlyTotalLogs                                                            =
Sheets(LogMonths(MonthCount)).Cells.Range("A:J").Find(What:="*", After:=[A1],
SearchOrder:=xlByRows, SearchDirection:=xlPrevious).Row
        MonthlyTotalLogs = Int((MonthlyTotalLogs – 1) / LogTemplateRows)
/* Loop through each log and collect the necessary data. */
    For MonthlyLogCount = 0 To MonthlyTotalLogs – 1
/* Check the log for a date, if it is present, collect the data for the log. */
        If Application.Range(LogMonths(MonthCount) & "!B" & 2 +
(LogTemplateRows * MonthlyLogCount)).Value <> vbNullString Then
/* Insert the date of the current log into A32+ of the Annual Profile sheet. */
            Application.Range("A" & 32 + TotalLogs).Formula = "=" &
LogMonths(MonthCount) & "!$B$" & 2 + (LogTemplateRows * MonthlyLogCount)
            Application.Range("A" & 32 + TotalLogs).NumberFormat =
"m/d/yyyy"
/* Insert the day of year corresponding to the date of current log into B32+ of the
Annual Profile sheet and set cell format to not show decimals. */
            Application.Range("B" & 32 + TotalLogs).Formula = "=" &
"A" & 32 + TotalLogs & "-DATE(YEAR(" & "A" & 32 + TotalLogs & "),1,0)"
            Application.Range("B" & 32 + TotalLogs).NumberFormat =
"0"
/* Insert As Built KW of current log into C32+ of the Annual Profile sheet and set cell
format to not show decimals. */
            Application.Range("C" & 32 + TotalLogs).Formula = "=" &
LogMonths(MonthCount) & "!$B$" & 101 + (LogTemplateRows *
MonthlyLogCount)
```

```
            Application.Range("C" & 32 + TotalLogs).NumberFormat =
"0"
/* Insert Demand Flow KW of current log into D32+ of the Annual Profile sheet and
set cell format to not show decimals. */
            Application.Range("D" & 32 + TotalLogs).Formula = "=" &
LogMonths(MonthCount) & "!$B$" & 110 + (LogTemplateRows *
MonthlyLogCount)
            Application.Range("D" & 32 + TotalLogs).NumberFormat =
"0"
/* Insert Demand Flow & Replacement Chiller KW of current log into E32+ of the
Annual Profile sheet and set cell format to not show decimals. */
            Application.Range("E" & 32 + TotalLogs).Formula = "=" &
LogMonths(MonthCount) & "!$B$" & 116 + (LogTemplateRows *
MonthlyLogCount)
            Application.Range("E" & 32 + TotalLogs).NumberFormat =
"0"
            TotalLogs = TotalLogs + 1
        End If
    Next
    Next
/* Re-enable automatic calculation since log data collection is complete. */
    Application.Calculation = xlCalculationAutomatic
/* Activate chart one so it can be operated on. */
    ActiveSheet.ChartObjects("Chart 1").Activate
    Dim DataSet As Integer
/* Loop to update series values for as built, demand flow and df + replacement chiller
KW. */
    For DataSet = 1 To 3
        Application.ActiveChart.SeriesCollection(DataSet).XValues       =
"='Annual Profile'!R32C2:R" & 32 + TotalLogs – 1 & "C2"
        Application.ActiveChart.SeriesCollection(DataSet).Values        =
"='Annual Profile'!R32C" & 2 + DataSet & ":R" & 32 + TotalLogs – 1 & "C" & 2 +
DataSet
    Next
/* Call the AnnualCalc_Click procedure to generate the equations for the data just
collected. */
    AnnualCalc_Click
End Sub
```

The following procedure may be called from the Retrieve-Data procedure to generate the equations for the collected data.

```
Sub AnnualCalc_Click( )
    Dim strFormula1 As String
    Dim strFormula2 As String
    Dim strFormulaFinal As String
    Dim strFormulaCurrent As String
    Dim strTemp As String
/* Day from the beginning of the year for the first day of the corresponding month;
used in later formula. */
    Dim days(0 T o 11) As String
    days(0) = 0
    days(1) = 31
    days(2) = 59
    days(3) = 90
    days(4) = 120
    days(5) = 151
    days(6) = 181
    days(7) = 212
    days(8) = 243
    days(9) = 273
    days(10) = 304
    days(11) = 334
    Dim FromColumn As String
    Dim ToColumn As String
    Dim MultColumn As String
    Dim EquationColumn(0 To 2) As String
    Dim InitialRow As Integer
    Dim CurrentRow As Integer
/* Variables used to describe the range of cells in which the formulas will be inserted.
*/
    FromColumn = "H"
    ToColumn = "I"
    MultColumn = "J"
```

```
        EquationColumn(0) = "K"
        EquationColumn(1) = "L"
        EquationColumn(2) = "M"
        InitialRow = 32
/* Disable screen updating and automatic calculation while the formulas are inserted
into the sheet. */
        Application.ScreenUpdating = False
        Application.Calculation = xlCalculationManual
/* If there is any error during integration, trigger the error code. */
        On Error GoTo Error
/* Unprotect the worksheet and activate chart 1. */
        Application.Sheets("Annual Profile").Unprotect ""
        ActiveSheet.ChartObjects("Chart 1").Activate
/* Loop 3 times to handle as built, demand flow, and df + replacement trendlines. */
        For EquationCount = 0 To 2
/* Store trend line equation from chart 1 in a temporary variable for manipulation. */
            strFormula1 = Application.ActiveChart.SeriesCollection(EquationCount + 1).Trendlines(1).DataLabel.Text
/* Perform necessary operations on the string to produce the integral of the trend line
equation. */
            strFormula1 = Application.WorksheetFunction.Substitute(strFormula1,
"x6", "*(TOCELL^7)/7")
            strFormula1 = Application.WorksheetFunction.Substitute(strFormula1,
"x5", "*(TOCELL^6)/6")
            strFormula1 = Application.WorksheetFunction.Substitute(strFormula1,
"x4", "*(TOCELL^5)/5")
            strFormula1 = Application.WorksheetFunction.Substitute(strFormula1,
"x3", "*(TOCELL^4)/4")
            strFormula1 = Application.WorksheetFunction.Substitute(strFormula1,
"x2", "*(TOCELL^3)/3")
            strFormula1 = Application.WorksheetFunction.Substitute(strFormula1,
"x", "*(TOCELL^2)/2")
            strFormula1 = Application.WorksheetFunction.Substitute(strFormula1,
"y ", "")
            strFormula1 = Application.WorksheetFunction.Substitute(strFormula1,
"= ", "=(")
            strFormula1 = strFormula1 & "*TOCELL)"
            strFormula2 = Application.WorksheetFunction.Substitute(strFormula1,
"TOCELL", "FROMCELL")
            strFormula2 = Application.WorksheetFunction.Substitute(strFormula2,
"=", "-")
/* Add portion of formula to perform conversion to hours. */
            strFormulaFinal = strFormula1 & strFormula2 & ")*24*RUNTIME"
/* Additional formatting. */
            strFormulaFinal = Application.WorksheetFunction.Substitute(strFormulaFinal, "=", "=(")
/* Loop through each month and substitute cell locations into FROMCELL, TOCELL
and runtime. */
            For RowCount = 0 To 11
                CurrentRow = InitialRow + RowCount
                strTemp = "(" & days(RowCount) & "+" & FromColumn & CurrentRow & ")"
                strFormulaCurrent = Application.WorksheetFunction.Substitute(strFormulaFinal, "FROMCELL", strTemp)
                strTemp = "(" & days(RowCount) & "+" & ToColumn & CurrentRow & ")"
                strFormulaCurrent = Application.WorksheetFunction.Substitute(strFormulaCurrent, "TOCELL", strTemp)
                strTemp = MultColumn & CurrentRow
                strFormulaCurrent = Application.WorksheetFunction.Substitute(strFormulaCurrent, "RUNTIME", strTemp)
/* Place formula with proper cell substitutions into the proper cell. */
                strTemp = EquationColumn(EquationCount) & CurrentRow
                Application.Range(strTemp).Formula = strFormulaCurrent
            Next
        Next
/* Re-enable screen updating and automatic calculation. */
        Application.ScreenUpdating = True
        Application.Calculation = xlCalculationAutomatic
Exit Sub
/* Code to be run if there is an error encountered while performing the string
substitution necessary for integration. */
Error:
        MsgBox ("An Error occured during integration calculation." & vbCr & " " &
vbCr & "Make sure that the logs are filled out correctly and that there are enough logs
for calculation."), vbCritical, "Error"
        Range("K32:M43").Formula = ""
```

```
/* Re-enable screen updating and automatic calculation. Since this code path skipped
the other re-enabling. */
    Application.ScreenUpdating = True
    Application.Calculation = xlCalculationAutomatic
End Sub
```

As Built KWH, Demand Flow KWH, Demand Flow & Replacement Chiller KWH values will now be described with regard to FIG. 4F. As can be seen, there may be more than one of each field corresponding at various periods of time. In FIG. 4F for example, there is an output field for each month for these values.

These KWH values may be calculated with one or more data processing units using the same general formula. Different input may be used to calculate each particular KWH value. For example, a different trend line, start day, end day, and percent run time may be used to calculate As Built KWH, Demand Flow KWH, Demand Flow & Replacement Chiller KWH values. Calculations may be performed for one or more periods of time, such as monthly as shown in FIG. 4F.

In one embodiment, a KWH value may be calculated by taking the integral of the appropriate trend line. For example, an integral of the As Built KW trend line in the graph of FIG. 4F may be used to calculate the As Built KWH value. Likewise, an integral of the Demand Flow KW and Demand Flow & Replacement Chiller KW trend lines, such as shown in FIG. 4F, may be used to calculate Demand Flow KWH and Demand Flow & Replacement Chiller KWH, respectively. The integral may be evaluated using the end day and the start day of the current month. The integral at the start day may be subtracted from the end day result. The result of this subtraction may be multiplied by 24 to convert it to hours, and by the percent run time entered for the current month to take actual run time into account.

The following is an example utilizing sample data from an exemplary trend line. In the following, END_DAY is the end day of a month, START_DAY is the start day of a month, and PCT_RUN_TIME is the percentage of run time. KWH=
((0.000000000168946*((0+END_DAY)^7)/7−
0.000000161222999*((0+END_DAY)^6)/6+
0.000056659299299*((0+END_DAY)^5)/5−
0.009106665018335*((0+END_DAY)^4)/4+
0.691895573123576*((0+END_DAY)^3)/3−
22.9498173500855*((0+END_DAY)^2)/2+
711.063899679682*(0+END_DAY))−
(0.000000000168946*((0+END_DAY)^7)/7−
0.000000161222999*((0+START_DAY)^6)/6+
0.000056659299299*((0+START_DAY)^5)/5−
0.009106665018335*((0+START_DAY)^4)/4+
0.691895573123576*((0+START_DAY)^3)/3−
22.9498173500855*((0+START_DAY)^2)/2+
711.063899679682*(0+H32)))*24*PCT_RUN_TIME.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A computer program product fixed in a tangible medium for determining one or more effects of changes to a chilled water plant comprising:
machine readable code fixed on the tangible medium, the machine readable code comprising one or more instructions for:
receiving specification data for one or more components of a chilled water plant;
receiving load data indicating the load on the one or more components for one or more periods of time;
determining one or more summarized load values from the load data for the one or more periods of time;
receiving representative log data from one or more logs of the chilled water plant, wherein the representative log data has an attribute of being log data from the one or more logs having a load value closest to at least one of the one or more summarized load values; and
determining an idealized power utilization for the chilled water plant from the specification data and the representative log data.

2. The computer program product of claim 1, wherein the machine readable code further comprises one or more instructions for determining and outputting one or more differences between the idealized power utilization and a current power utilization for the chilled water plant.

3. The computer program product of claim 1, wherein the machine readable code further comprises one or more instructions for presenting the one or more summarized load values for the one or more periods of time to allow the representative log data to be identified.

4. The computer program product of claim 1, wherein the one or more instructions are configured to calculate the idealized power utilization from the specification data and wet bulb data for a geographic location where the chilled water plant is located.

5. The computer program product of claim 4, wherein the machine readable code further comprises one or more instructions for receiving the geographic location.

6. The computer program product of claim 1, wherein the specification data comprises design specifications for the one or more components of the chilled water plant, the design specifications selected from the group consisting of energy utilization, output, water supply temperatures, and water return temperatures.

7. The computer program product of claim 1, wherein the load data comprises load values for one or more chillers of the chilled water plant.

8. The computer program product of claim 1, wherein the representative log data comprises plant log data for at least one or more chillers of the chilled water plant, the plant log data selected from the group consisting of pumping frequencies, fan frequencies, water supply temperatures, and water return temperatures.

9. A qualification system for determining one or more effects of one or more chilled water plant upgrades comprising:
a processor;
a memory device; and
machine readable code executable by the processor and stored on the memory device;

one or more first data input fields generated by executing the machine readable code, the one or more first data input fields configured to accept empirical log data for a chilled water plant for one or more periods of time;

one or more first data processing units configured to generate at least one numerical value summarizing the empirical log data for the one or more periods of time, the one or more first data processing units implemented by the machine readable code;

one or more second data input fields generated by executing the machine readable code, the one or more second data input fields configured to accept representative log data, the representative log data comprising data selected from one or more logs of the chilled water plant having a value closest to the at least one numerical value of at least one of the one or more periods of time;

one or more third data input fields generated by executing the machine readable code, the one or more third data input fields configured to accept specification data for the chilled water plant;

one or more second data processing units configured to calculate at least an idealized power utilization and a current power utilization for the chilled water plant with at least the specification data and the representative log data, the one or more second data processing units implemented by the machine readable code.

10. The qualification system of claim 9, wherein the one or more first data processing units are configured to summarize the load data by a mathematical function selected from the group consisting of a mean function, median function, and average function.

11. The qualification system of claim 9, wherein the representative log data is at least one set of log data having load values closest to the at least one numerical value summarizing the empirical log data for the one or more periods of time.

12. The qualification system of claim 9 further comprising one or more third data processing units configured to determine and output one or more differences between the idealized power utilization and the current power utilization of the chilled water plant.

13. The qualification system of claim 9 further comprising one or more fourth data input units configured to accept a location for the chilled water plant, wherein the idealized power utilization is calculated with at least the specification data and wet bulb data for the location of the chilled water plant.

14. The qualification system of claim 9, wherein the first data input fields are configured to collect the empirical log data for monthly periods of time.

15. A method of determining the effect of one or more chilled water plant upgrades utilizing a qualification system comprising:

inputting specification data for one or more components of a chilled water plant into one or more data inputs of the qualification system;

inputting chiller load data indicating the load on one or more chillers for one or more periods of time into the one or more data inputs to calculate an average chiller load from the chiller load data for the one or more periods of time;

identifying representative log data from one or more logs of the chilled water plant, wherein the representative log data has an attribute of being data from the one or more logs having a chiller load value closest to the average chiller load of at least one of the one or more periods of time;

inputting the representative log data identified from the one or more logs of the chilled water plant into the one or more data inputs to calculate a power utilization of the chilled water plant from the representative log data; and initializing an analysis to compare the power utilization of the chilled water plant to an idealized power utilization of the chilled water plant, wherein the idealized power utilization is calculated with at least the specification data.

16. The method of claim 15 further comprising presenting one or more results of the analysis to display the effect of the one or more chilled water plant upgrades.

17. The method of claim 15 further comprising identifying and inputting additional representative log data to increase the accuracy of the analysis.

18. The method of claim 15 further comprising inputting a geographic location of the chilled water plant into the one or more data inputs, wherein the idealized power utilization is calculated with at least the specification data and wet bulb data for the geographic location.

19. The method of claim 15, wherein inputting the representative logs comprises inputting at least twelve representative logs for a yearly period.

20. The method of claim 15 further comprising adjusting a running time of the chilled water plant to reflect actual runtime of the chilled water plant, wherein the idealized power utilization is calculated with at least the specification data and running time.

* * * * *